US009618312B2

(12) United States Patent
Shimaoka et al.

(10) Patent No.: US 9,618,312 B2
(45) Date of Patent: Apr. 11, 2017

(54) MEASURING PROBE

(71) Applicant: MITUTOYO CORPORATION, Kanagawa (JP)

(72) Inventors: Atsushi Shimaoka, Kanagawa (JP); Tomoyuki Miyazaki, Kanagawa (JP); Kazuhiko Hidaka, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 109 days.

(21) Appl. No.: 14/789,283

(22) Filed: Jul. 1, 2015

(65) Prior Publication Data
US 2016/0258733 A1 Sep. 8, 2016

(30) Foreign Application Priority Data
Mar. 5, 2015 (JP) .................. 2015-043034

(51) Int. Cl.
*G01B 3/00* (2006.01)
*G01B 5/20* (2006.01)
(Continued)

(52) U.S. Cl.
CPC .......... *G01B 3/008* (2013.01); *G01B 5/0016* (2013.01); *G01B 5/012* (2013.01); *G01B 5/20* (2013.01)

(58) Field of Classification Search
CPC ...... G01B 3/008; G01B 5/0016; G01B 5/012; G01B 5/20; G01B 11/007
(Continued)

(56) References Cited

U.S. PATENT DOCUMENTS 5,040,306 A    8/1991  McMurtry et al.
5,345,689 A *  9/1994  McMurtry ............. G01B 3/008
                                                    33/556

(Continued)

FOREIGN PATENT DOCUMENTS

JP    S58-088604    5/1983
JP    H04-369401   12/1992
(Continued)

OTHER PUBLICATIONS

Office Action in Japanese Patent Application No. 2015-043034 with partial English translation, dated Jul. 19, 2016.
(Continued)

*Primary Examiner* — Yaritza Guadalupe-McCall
(74) *Attorney, Agent, or Firm* — Greenblum & Bernstein, P.L.C.

(57) ABSTRACT

A measuring probe includes a stylus having a contact part to be in contact with an object to be measured, an axial motion mechanism having a moving member that allows the contact part to move in an axial direction, and a rotary motion mechanism having a rotating member that allows the contact part to move along a plane perpendicular to the axial direction by means of rotary motion. The measuring probe includes a probe main body that incorporates the axial motion mechanism, and a probe module that is supported by the probe main body, incorporates the rotary motion mechanism, and supports the stylus. The probe main body and the probe module are detachably coupled to each other with a pair of rollers and a ball capable of positioning to each other. This allows adequate detection sensitivity and a restoring force suitable for the stylus to be obtained at a low cost.

22 Claims, 14 Drawing Sheets

(51) Int. Cl.
  *G01B 5/00* (2006.01)
  *G01B 5/012* (2006.01)
(58) Field of Classification Search
  USPC .......................................................... 33/503
  See application file for complete search history.

(56) References Cited

U.S. PATENT DOCUMENTS

| | | | |
|---|---|---|---|
| 5,918,378 A | 7/1999 | McMurtry et al. | |
| 6,430,833 B1* | 8/2002 | Butter | G01B 5/012 33/556 |
| 6,971,183 B2 | 12/2005 | Brenner et al. | |
| 7,055,258 B2 | 6/2006 | Hajdukiewicz et al. | |
| 7,146,741 B2 | 12/2006 | Butter et al. | |
| 8,701,301 B2 | 4/2014 | Nakayama et al. | |
| 9,057,599 B2 | 6/2015 | Mariller et al. | |
| 2002/0174556 A1 | 11/2002 | Butter et al. | |
| 2005/0055839 A1 | 3/2005 | Brenner et al. | |
| 2005/0150125 A1 | 7/2005 | Hajdukiewicz et al. | |
| 2011/0094117 A1* | 4/2011 | Groell | G01B 5/012 33/503 |
| 2012/0297906 A1* | 11/2012 | Groell | G01B 5/012 73/866.5 |
| 2013/0047452 A1 | 2/2013 | McMurtry et al. | |
| 2013/0212890 A1 | 8/2013 | Mariller et al. | |
| 2013/0212891 A1 | 8/2013 | Mariller et al. | |
| 2013/0304250 A1* | 11/2013 | McMurtry | G01B 5/012 700/195 |
| 2014/0011444 A1* | 1/2014 | Groell | H01Q 21/28 455/39 |
| 2014/0053423 A1* | 2/2014 | Brenner | G01B 5/008 33/503 |
| 2016/0258733 A1* | 9/2016 | Shimaoka | G01B 3/008 |
| 2016/0258738 A1* | 9/2016 | Shimaoka | G01B 5/012 |
| 2016/0258744 A1* | 9/2016 | Shimaoka | G01B 11/14 |

FOREIGN PATENT DOCUMENTS

| | | |
|---|---|---|
| JP | H07-198370 | 8/1995 |
| JP | 2002-541444 | 12/2002 |
| JP | 2005-522655 | 7/2005 |
| JP | 2006-343249 | 12/2006 |
| JP | 4417114 B | 2/2010 |
| JP | 2013-171039 | 9/2013 |

OTHER PUBLICATIONS

Extended European Search Report in European Patent Application No. 15175424.9—1568, dated Aug. 3, 2016.
Decision to Grant a patent issued in Japan Patent Appl. No. 2015-043034 with English translation, dated Nov. 15, 2016.
U.S. Appl. No. 14/789,211 to Atsushi Shimaoka et al., which was filed on Jul. 1, 2015.
U.S. Appl. No. 14/789,266 to Atsushi Shimaoka et al., which was filed on Jul. 1, 2015.

* cited by examiner

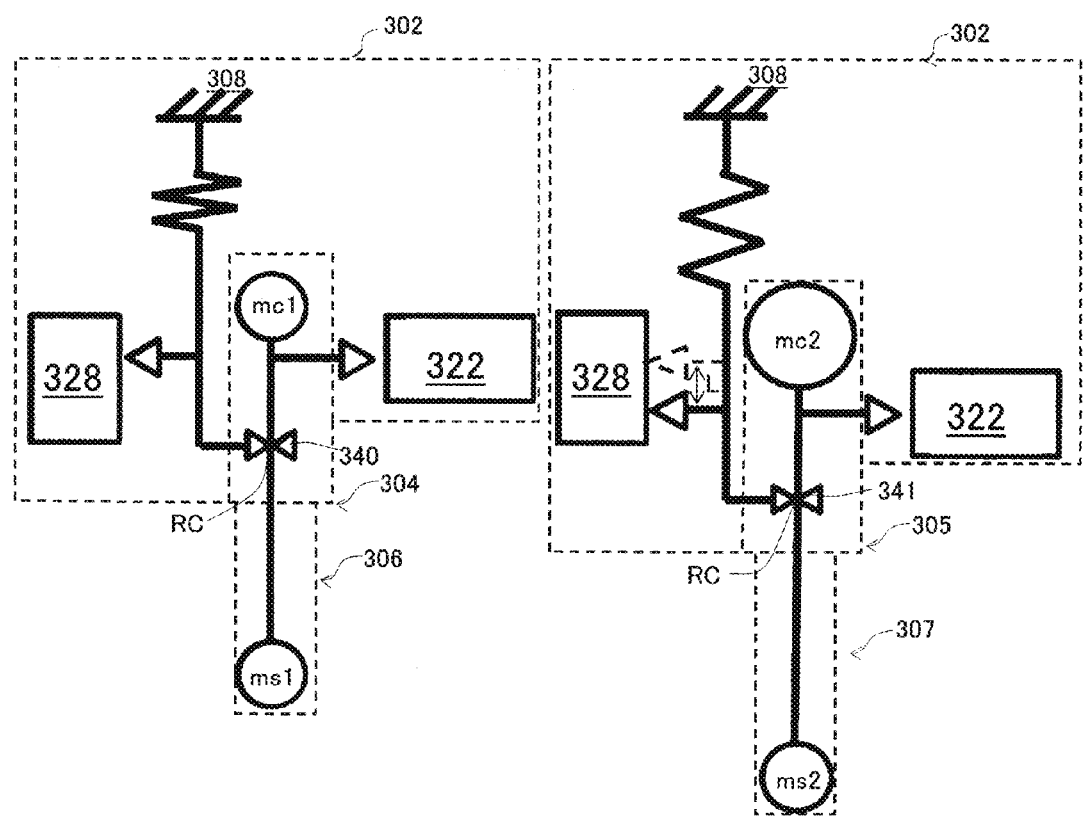

Fig. 8A
Fig. 8B
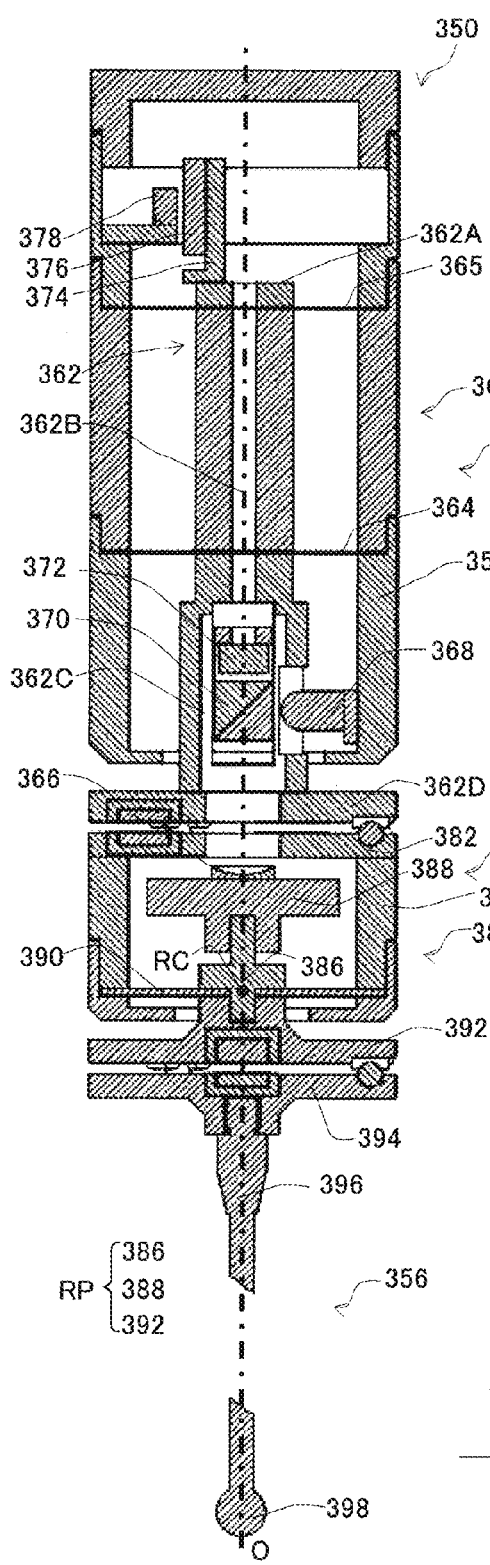
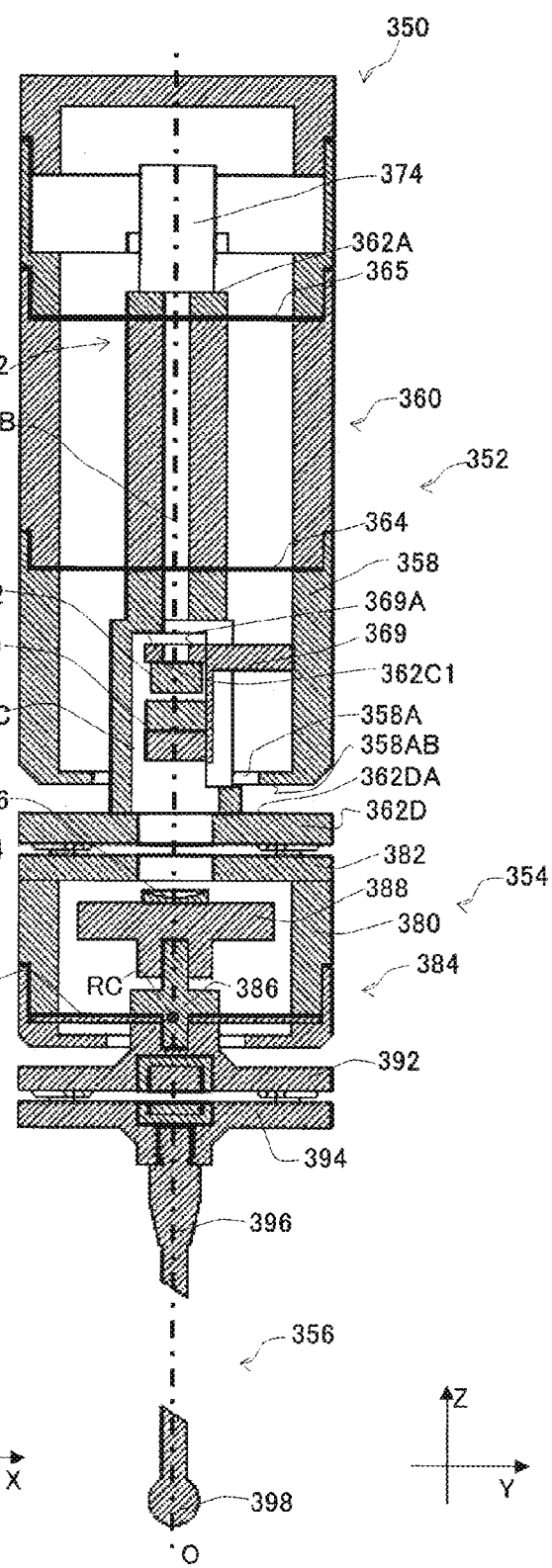

Fig. 12A
Fig. 12B
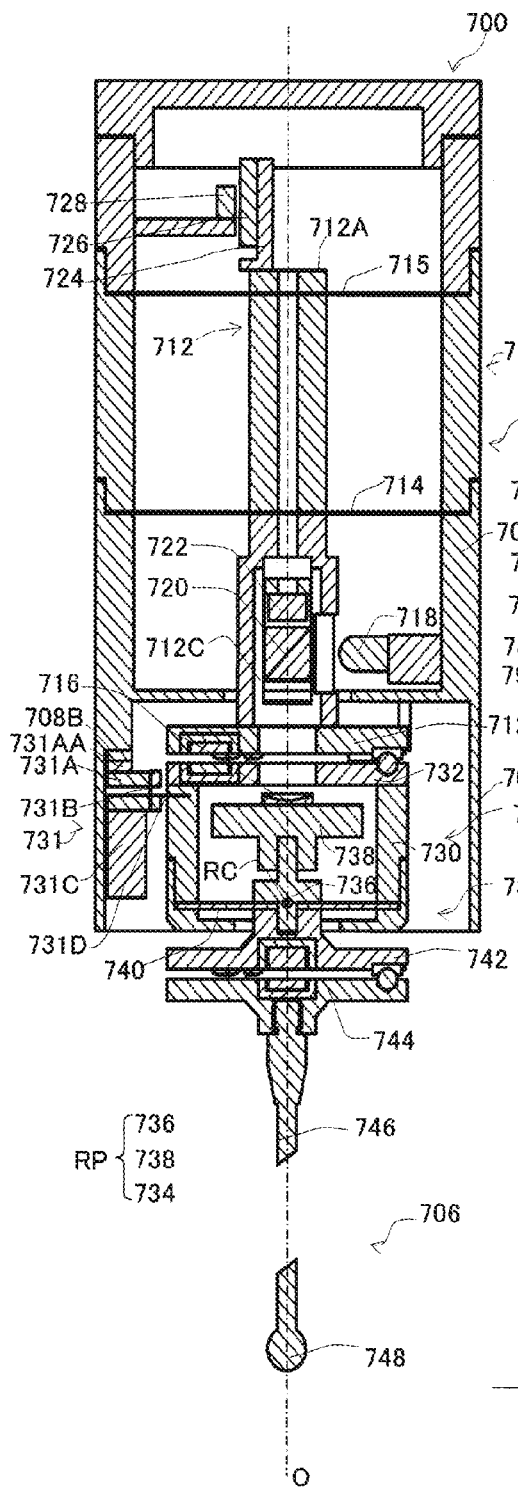
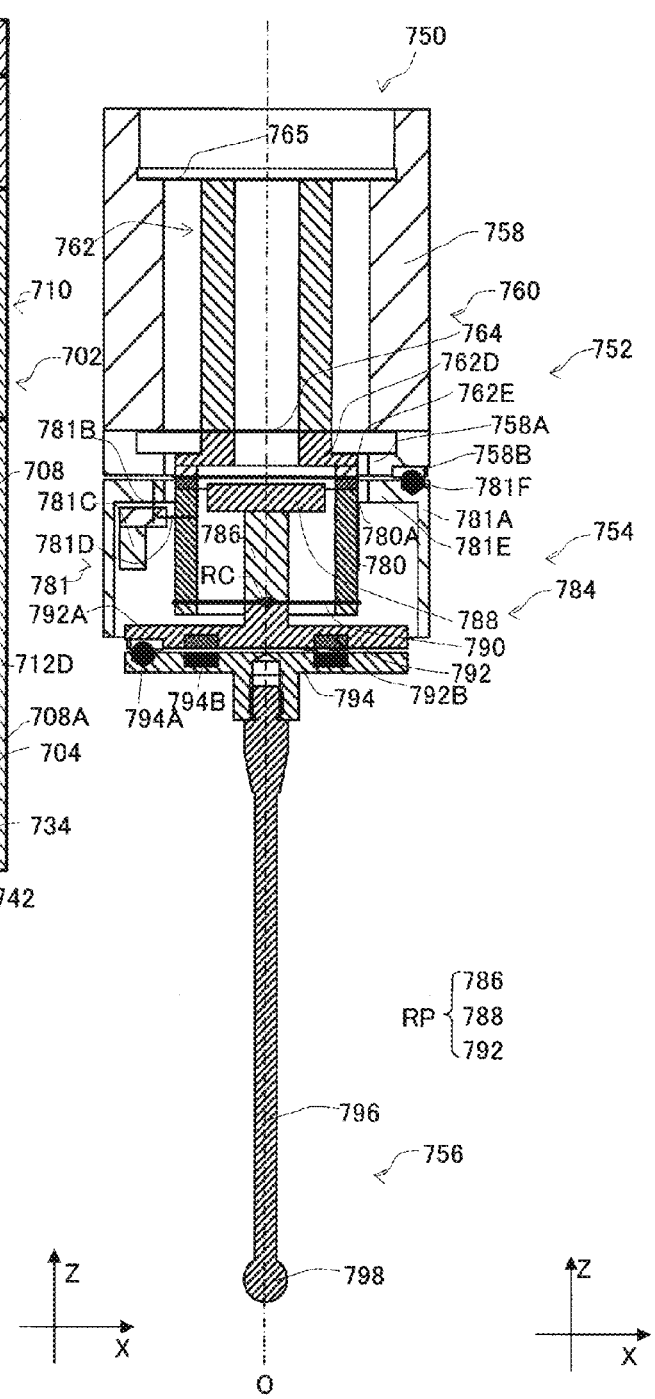

MEASURING PROBE

CROSS-REFERENCE TO RELATED APPLICATION

The disclosure of Japanese Patent Application No. 2015-043034 filed on Mar. 5, 2015 including specifications, drawings and claims is incorporated herein by reference in its entirety.

TECHNICAL FIELD

The present invention relates to a measuring probe, and in particular, to a measuring probe capable of obtaining adequate detection sensitivity and a restoring force suitable for a stylus at a low cost.

BACKGROUND ART

A three-dimensional measuring machine, for example, has been known as a measuring apparatus for measuring a surface shape of an object to be measured by contacting with the surface thereof. Japanese Patent No. 4417114 (hereinafter referred to as Patent Literature 1) describes a three-dimensional measuring machine employing a measuring probe that comes into contact with an object to be measured to detect the surface shape thereof. The measuring probe illustrated in Patent Literature 1 includes: a stylus having a contact part to be in contact with (a surface of) an object to be measured; an axial motion mechanism including a moving member that allows the contact part to move in a central axis direction (also referred to as a Z direction or an axial direction O) of the measuring probe; and a rotary motion mechanism including a rotating member that allows the contact part to move along a surface perpendicular to the Z direction by means of rotary motion. In Patent Literature 1, the axial motion mechanism and the rotary motion mechanism are connected in series and their directions in which the contact part of the stylus can move are set to be different from each other.

SUMMARY OF INVENTION

Technical Problem

The stylus is changed depending on an object to be measured. In doing so, adequate detection sensitivity and a restoring force (a force to restore displacement of the stylus) suitable for the changed stylus can be obtained by selecting the axial motion mechanism and the rotary motion mechanism corresponding to that stylus. However, there are an enormous number of styluses if slight differences are taken into consideration. If optimum axial motion mechanisms and rotary motion mechanisms are to be prepared for all of such many styluses, a considerable expense is incurred and this is therefore not a realistic solution. Thus, one axial motion mechanism and one rotary motion mechanism are employed for a plurality of styluses having similar characteristics (e.g., mass or lengths) to some extent.

When the axial motion mechanism and the rotary motion mechanism are integrally formed as in Patent Literature 1, however, the axial motion mechanism and the rotary motion mechanism necessarily need to be changed together. For example, when one of the axial motion mechanism and the rotary motion mechanism is allowable for the changed stylus but the other motion mechanism should be changed, both of the motion mechanisms have to be changed simultaneously. Thus, in obtaining adequate detection sensitivity and a restoring force while ensuring adequate performance of the motion mechanisms, the configuration as in Patent Literature 1 has difficulty in appropriately selecting the axial motion mechanism and the rotary motion mechanism while keeping a low cost.

The present invention has been made in order to solve the above-described problems in the conventional technique, and an object thereof is to provide a measuring probe capable of obtaining adequate detection sensitivity and a restoring force suitable for a stylus at a low cost.

Solution to Problem

A first aspect of the present invention provides a measuring probe including: a stylus having a contact part to be in contact with an object to be measured; an axial motion mechanism having a moving member that allows the contact part to move in an axial direction; and a rotary motion mechanism having a rotating member that allows the contact part to move along a plane perpendicular to the axial direction by means of rotary motion. The measuring probe solves the above-described problems by including: a probe main body that incorporates one of the axial motion mechanism and the rotary motion mechanism; and a probe module that is supported by the probe main body, incorporates the other one of the axial motion mechanism and the rotary motion mechanism, and supports the stylus, wherein the probe main body and the probe module are detachably coupled to each other with a first engagement part capable of positioning to each other.

A second aspect of the present invention provides the above-described measuring probe wherein the axial motion mechanism is incorporated in the probe main body, and the rotary motion mechanism is incorporated in the probe module.

A third aspect of the present invention provides the above-described measuring probe, wherein a plurality of the probe modules are prepared for the single probe main body, and a different restoring force per unit displacement when the rotating member is displaced is set for each of the plurality of probe modules.

A fourth aspect of the present invention provides the above-described measuring probe, wherein the rotating member includes a balancing member on a side opposite to the stylus with respect to a rotation center of the rotary motion mechanism, and a distance between the rotation center and the balancing member is adjustable.

A fifth aspect of the present invention provides the above-described measuring probe, wherein a plurality of the probe modules are prepared for the single probe main body, and a different distance between the rotation center and the balancing member is set for each of the plurality of probe modules.

A sixth aspect of the present invention provides the above-described measuring probe, wherein a plurality of the probe modules are prepared for the single probe main body, the rotating member includes a balancing member on a side opposite to the stylus with respect to a rotation center of the rotary motion mechanism, and different mass of the balancing member is set for each of the plurality of probe modules.

A seventh aspect of the present invention provides the above-described measuring probe, wherein the probe module includes: a balance weight corresponding to mass of the stylus; and a counterbalance mechanism supported by an axial element housing member for supporting the axial motion mechanism, the counterbalance mechanism keeping the stylus and the balance weight in balance.

An eighth aspect of the present invention provides the above-described measuring probe, wherein a plurality of the probe modules are prepared for the single probe main body, and different mass of the balance weight is set for each of the plurality of probe modules.

A ninth aspect of the present invention provides the above-described measuring probe, wherein the axial motion mechanism is incorporated in the probe module, and the rotary motion mechanism is incorporated in the probe main body.

A tenth aspect of the present invention provides the above-described measuring probe, wherein a plurality of the probe modules are prepared for the single probe main body, and a different restoring force per unit displacement when the moving member is displaced is set for each of the plurality of probe modules.

An eleventh aspect of the present invention provides the above-described measuring probe, including an axial element housing member that supports the axial motion mechanism, and wherein the axial element housing member is provided with a displacement detector for detecting displacement of the moving member.

A twelfth aspect of the present invention provides the above-described measuring probe, wherein the displacement detector outputs a relative position detection signal that allows detection of a relative position of the moving member.

A thirteenth aspect of the present invention provides the above-described measuring probe, wherein the displacement detector outputs an absolute position detection signal that allows detection of an absolute position of the moving member.

A fourteenth aspect of the present invention provides the above-described measuring probe, wherein the axial element housing member is provided with an interference optical system including an interference light source, a reference mirror for reflecting light from the interference light source, and a target mirror disposed in the moving member for reflecting light from the interference light source, the interference optical system capable of causing interference of reflected light from the reference mirror and the target mirror to generate a plurality of interference fringes, and the displacement detector can detect a phase shift of the plurality of interference fringes generated in the interference optical system.

A fifteenth aspect of the present invention provides the above-described measuring probe, including a preceding module that detachably couples and supports the probe main body with a second engagement part capable of positioning the probe main body, and wherein a reference member is provided on an opposite end to the stylus of a member directly supporting the stylus, and an orientation detector for detecting displacement of the reference member corresponding to a rotary movement of the stylus is incorporated in the preceding module.

A sixteenth aspect of the present invention provides the above-described measuring probe, wherein a reference member is provided on an opposite end to the stylus of a member directly supporting the stylus, and an orientation detector for detecting displacement of the reference member corresponding to a rotary movement of the stylus is incorporated in the probe main body.

A seventeenth aspect of the present invention provides the above-described measuring probe, wherein the axial motion mechanism includes a plurality of first diaphragm structures that allow the moving member to be displaced, and the orientation detector is disposed between the rotary motion mechanism and the plurality of first diaphragm structures when the axial motion mechanism is incorporated in the probe main body and the rotary motion mechanism is incorporated in the probe module.

An eighteenth aspect of the present invention provides the above-described measuring probe, wherein the reference member is a reflecting mirror for reflecting light, the measuring probe includes a light source for causing light to be incident on the reflecting mirror along an optical axis, and the orientation detector detects displacement of reflected light, reflected from the reflecting mirror, from the optical axis.

A nineteenth aspect of the present invention provides the above-described measuring probe, wherein the optical axis is provided so as to pass through the rotation center of the rotary motion mechanism.

A twentieth aspect of the present invention provides the above-described measuring probe, wherein the axial motion mechanism includes a plurality of first diaphragm structures that allow the moving member to be displaced, and the measuring probe includes a first limiting member for limiting an amount of deformation in the plurality of first diaphragm structures within a range of elastic deformation.

A twenty-first aspect of the present invention provides the above-described measuring probe, wherein the rotary motion mechanism includes a second diaphragm structure that allows the rotating member to be displaced, and the measuring probe includes a second limiting member for limiting an amount of deformation in the second diaphragm structure within a range of elastic deformation.

A twenty-second aspect of the present invention provides the above-described measuring probe, wherein at least part of a gap between a first wall member, which is disposed so as to face the moving member and to be integral with the axial element housing member for supporting the axial motion mechanism, and the moving member, is filled with a first viscous material.

A twenty-third aspect of the present invention provides the above-described measuring probe, wherein the rotary motion mechanism includes a second diaphragm structure that allows the rotating member to be displaced, and at least part of a gap between a second wall member, which is disposed to be integral with the rotary element housing member for supporting the rotary motion mechanism, and any of the second diaphragm structure and the rotating member is filled with a second viscous material.

In the present invention, adequate detection sensitivity and a restoring force suitable for a stylus can be obtained at a low cost. These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein:

FIGS. 7A and 7B are functional diagrams illustrating measuring probes having balancing members with mass different from each other;

FIG. 8A is a schematic diagram (a front view) illustrating a cross section of a measuring probe according to a second embodiment of the present invention, and FIG. 8B is a schematic diagram (a side view) illustrating a cross section including a cross section of the measuring probe;

FIG. 12A is a schematic diagram illustrating a cross section of a measuring probe according to a fifth embodiment of the present invention, and FIG. 12B is a schematic diagram illustrating a cross section of a measuring probe according to a sixth embodiment of the present invention;

DESCRIPTION OF EMBODIMENT

Embodiments of the present invention will be described below in detail with reference to the drawings.

The first embodiment according to the present invention will now be described with reference to FIGS. 1 to 7.

The general configuration of a measuring system 100 will be described first.

Figure 1:
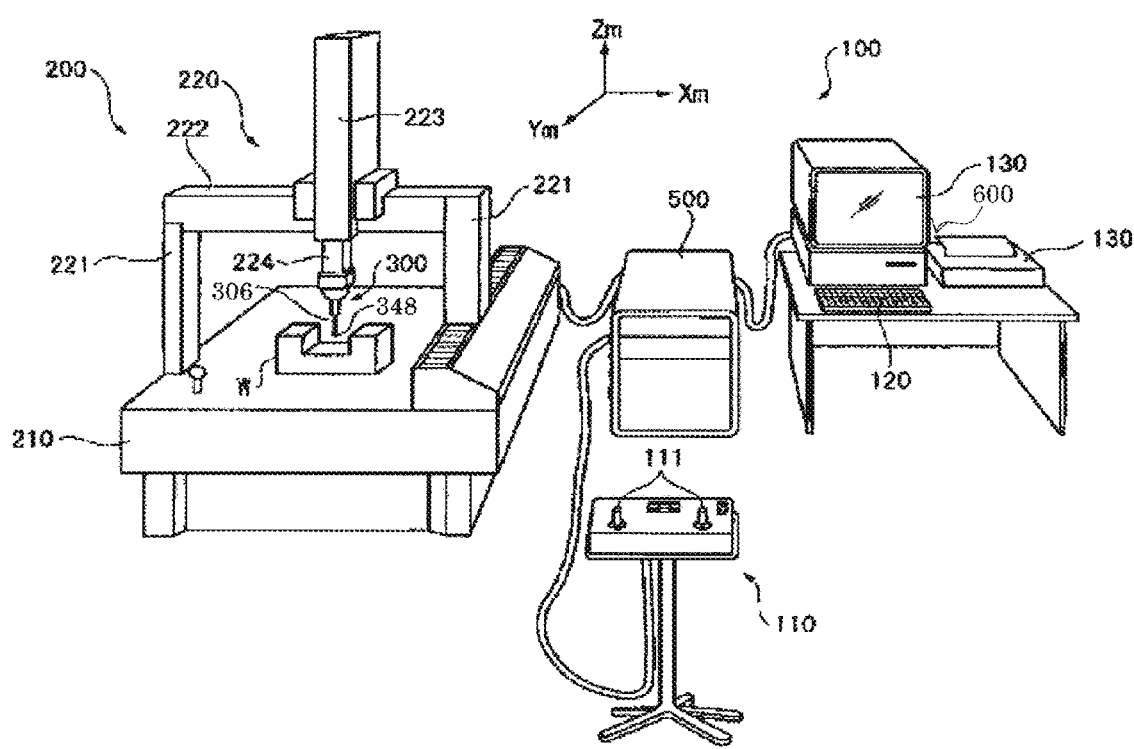
FIG. 1 is a schematic diagram illustrating an example of a measuring system that employs a measuring probe according to a first embodiment of the present invention.

As shown in FIG. 1, the measuring system 100 includes: a three-dimensional measuring machine 200 that moves a measuring probe 300; an operation part 110 having manually-operated joysticks 111; and a motion controller 500 that controls movements of the three-dimensional measuring machine 200. The measuring system 100 further includes: a host computer 600 that operates the three-dimensional measuring machine 200 via the motion controller 500 and processes measured data obtained by the three-dimensional measuring machine 200 to determine, for example, the dimension and shape of an object W to be measured; input unit 120 for inputting, for example, measurement conditions; and output unit 130 for outputting a result of measurement.

Components of the measuring system 100 will be described next.

As shown in FIG. 1, the three-dimensional measuring machine 200 includes: the measuring probe 300; a surface plate 210; a drive mechanism 220 provided to stand on the surface plate 210, for moving the measuring probe 300 three-dimensionally; and a drive sensor 230 that detects a drive amount of the drive mechanism 220.

Figure 2A:
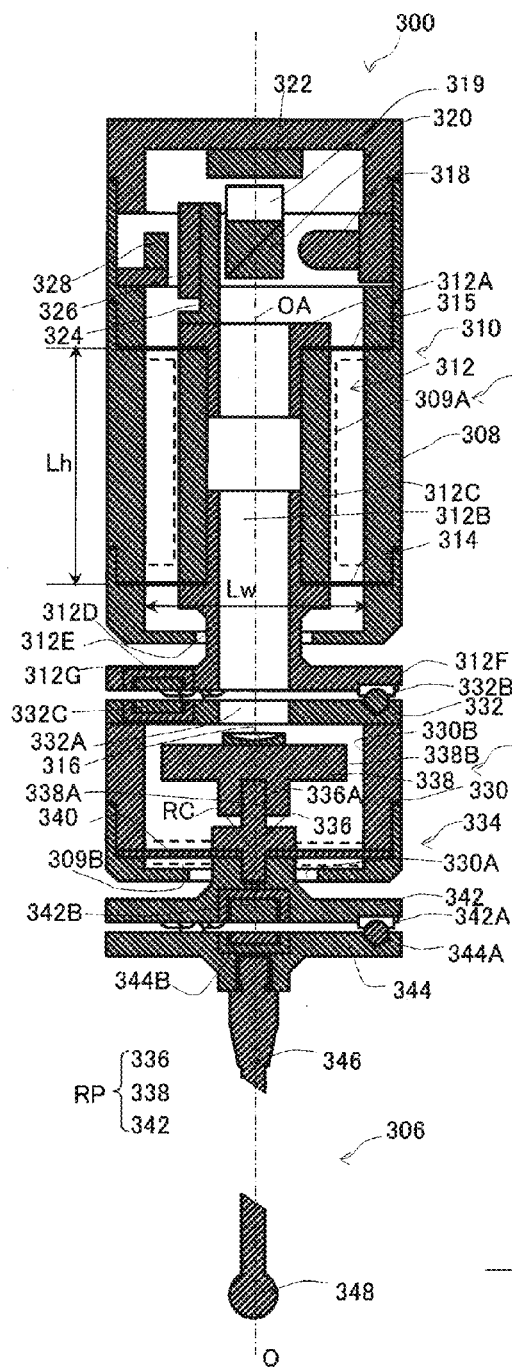
FIG. 2A is a schematic diagram (a front view) illustrating a cross section of a measuring probe according to the present invention.
Figure 2B:
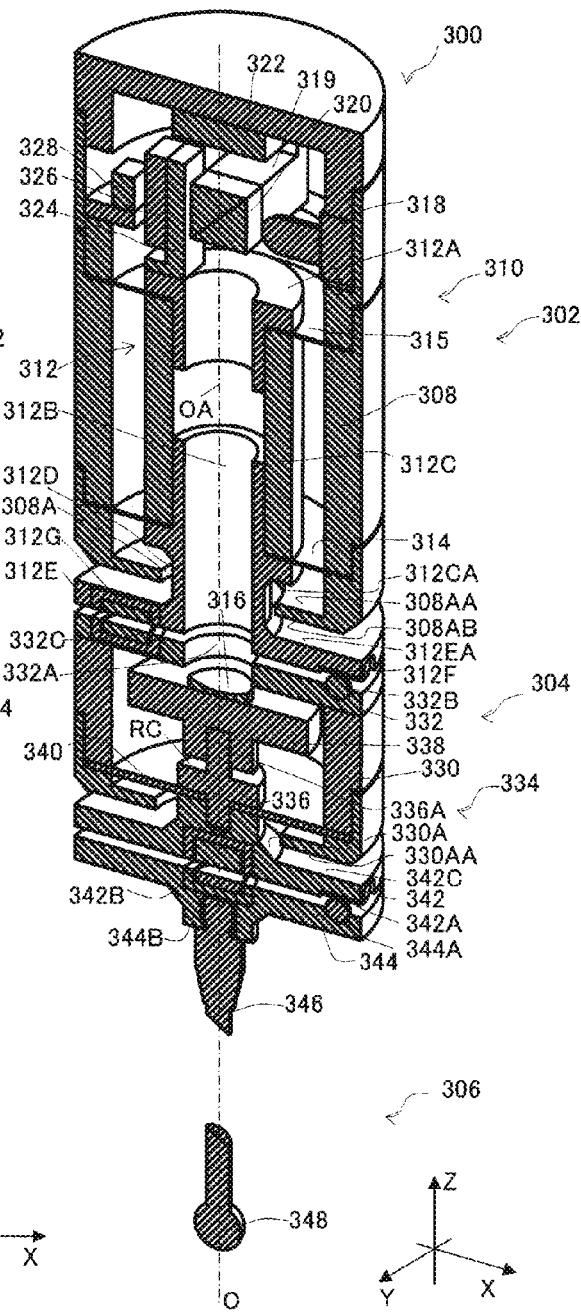
FIG. 2B is a schematic diagram illustrating a perspective view including a cross section of the measuring probe.

As shown in FIGS. 2A and 2B, the measuring probe 300 includes: a stylus 306; an axial motion mechanism 310; and a rotary motion mechanism 334. When coming into contact with a surface S of the object W to be measured, a contact part 348 of the stylus 306 can freely change its position in three directions along the shape of the surface S by means of the axial motion mechanism 310 and the rotary motion mechanism 334.

The general configuration of the measuring probe 300 will be further described with reference to FIGS. 2A and 2B. Note that for the purpose of illustration, the longitudinal direction on the plane of paper in FIG. 2A is defined as a Z direction, the horizontal direction on the plane of the paper is defined as an X direction, and the perpendicular direction to the plane of the paper is defined as a Y direction. Thus, the direction of a central axis O (axial direction O) of the measuring probe 300 coincides with the Z direction.

As shown in FIGS. 2A and 2B, the measuring probe 300 includes: the stylus 306 having the contact part 348 to be in contact with the object W to be measured; the axial motion mechanism 310 having a moving member 312 that allows the contact part 348 to move in the axial direction O; and the rotary motion mechanism 334 having a rotating member RP that allows the contact part 348 to move along the plane perpendicular to the axial direction O by means of rotary motion. Here, the measuring probe 300 includes: a probe main body 302, which incorporates the axial motion mechanism 310; and a probe module 304, which is supported by the probe main body 302, incorporates the rotary motion mechanism 334, and supports the stylus 306. The probe main body 302 and the probe module 304 are detachably coupled to each other with rollers 312F and balls 332B (first engagement part) capable of positioning to each other.

A plurality of styluses 306 (having the contact parts 348 of different materials, at different positions, or with different mass, for example) are prepared. Corresponding to the styluses 306, a plurality of probe modules 304 (the number thereof may not necessarily be the same as the number of the styluses 306) are prepared for the single probe main body 302. Note that being "incorporated" herein means that a member to be "incorporated" is supported radially inside of its corresponding housing member (e.g., a main body housing 308 when the member to be "incorporated" is "incorporated" in the probe main body 302; or a module housing 330 when the member to be "incorporated" is "incorporated" in the probe module 304) and has no portion positioned only in the inside of other module(s) or other housing member(s) disposed outside the corresponding housing member.

Components of the measuring probe 300 will be described below in detail.

Figure 3:
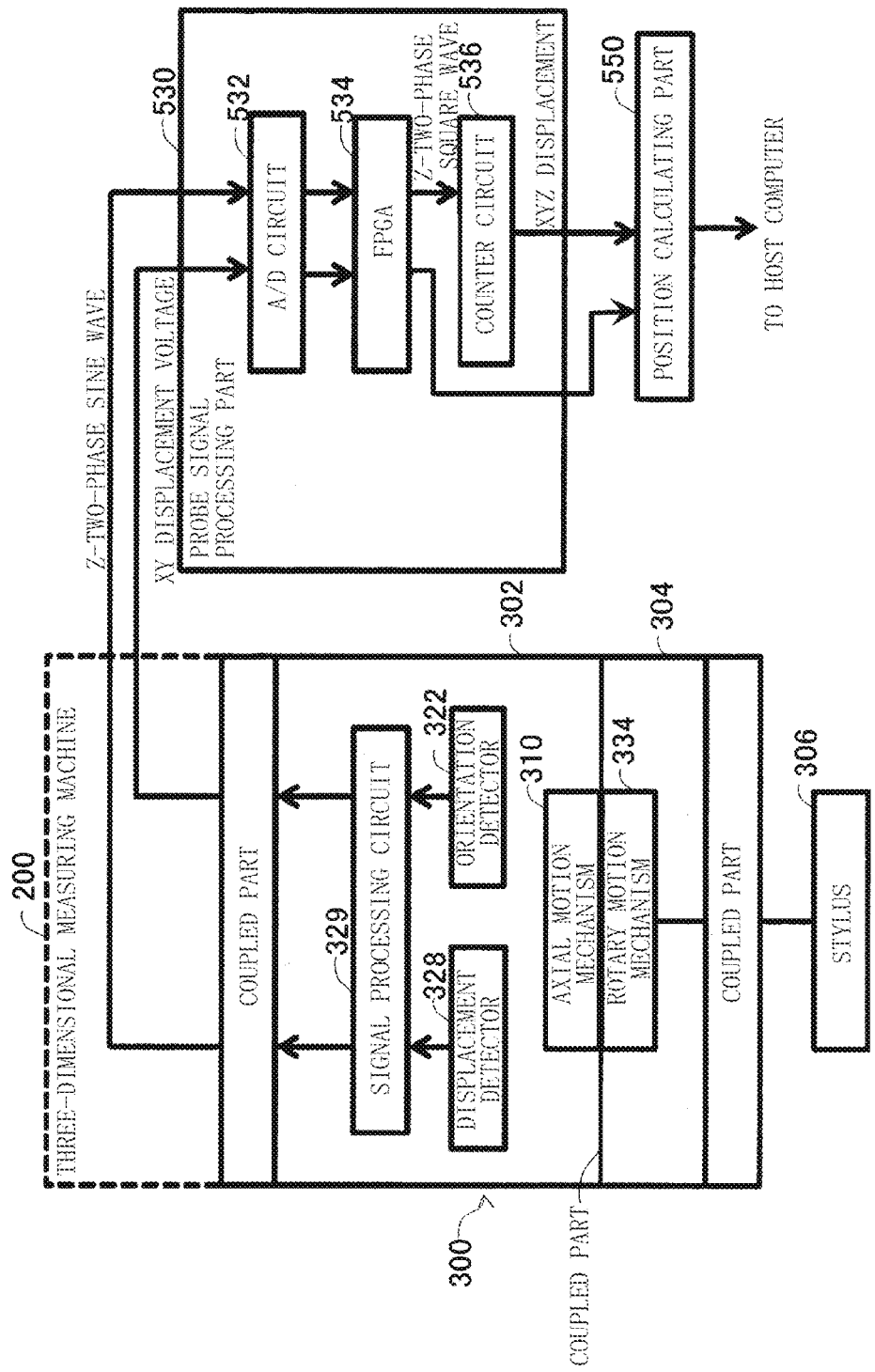
FIG. 3 is a block diagram illustrating a configuration of the measuring probe and peripherals thereof.

As shown in FIGS. 2A and 2B, the probe main body 302 includes: the main body housing (axial element housing member) 308; the axial motion mechanism 310; the orientation detector 322; the displacement detector 328; and a signal processing circuit 329 (FIG. 3).

As shown in FIGS. 2A and 2B, the main body housing 308 has a cylindrical shape with a cover and includes an opening 308A on a lower end thereof. The main body housing 308 supports and houses the axial motion mechanism 310 radially inside thereof except for a flange portion 312E of the moving member 312. The flange portion 312E is coupled to the probe module 304 without penetrating into the probe module 304.

As shown in FIGS. 2A and 2B, the axial motion mechanism 310 includes: the moving member 312; and a pair of first diaphragm structures 314 and 315 that allows the moving member 312 to be displaced with respect to the main body housing 308.

As shown in FIGS. 2A and 2B, the moving member 312 has a generally cylindrical shape having a hollow portion 312B around its axial center. More specifically, the moving member 312 integrally includes: a thick portion 312C; a thin portion 312D; and the flange portion 312E from the upper part toward the lower part thereof in the Z direction. The pair of first diaphragm structures 314 and 315 are coupled to the thick portion 312C. The thin portion 312D is formed below the thick portion 312C. Note that a diameter of the opening 308A of the main body housing 308 is set to be smaller than an outer diameter of the thick portion 312C. An outer diameter of the flange portion 312E is set to be larger than the diameter of the opening 308A. Here, a distance between a lower end 312CA of the thick portion 312C and an upper end 308AA of the opening 308A and a distance between an upper end 312EA of the flange portion 312E and a lower end 308AB of the opening 308A are determined to regulate displacement of the moving member 312 in the Z direction so that an amount of deformation in the pair of first diaphragm structures 314 and 315 falls within the range of elastic deformation. In other words, it can be said that the probe main body 302 includes the main body housing 308 and the moving member 312 together serving as a first limiting member for limiting an amount of deformation in the pair of first diaphragm structures 314 and 315 within the range of elastic deformation.

Along a periphery on a lower end of the flange portion 312E, one pair of rollers 312F is provided at each of positions at intervals of 120 degrees in the circumferential direction thereof, i.e., totally three pairs of rollers 312F are provided at intervals of 120 degrees in the circumferential direction thereof as shown in FIGS. 2A and 2B. Three permanent magnets 312G are provided so as to be out of phase with the rollers 312F by 60 degrees in the circumferential direction. Note that the axial direction of the pair of rollers 312F coincides with an approximately radial direction toward the center of the flange portion 312E.

Figure 4A:
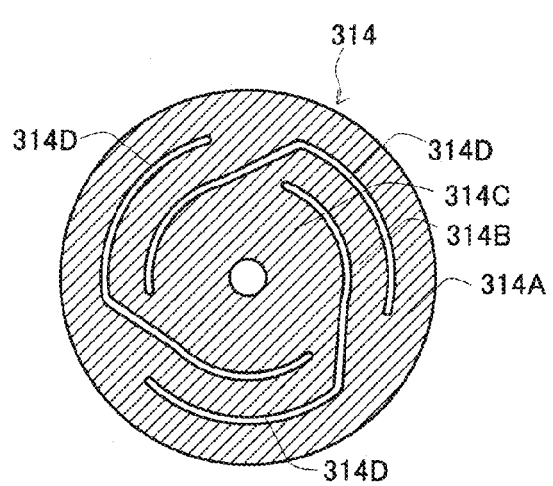
FIG. 4A is a schematic diagram illustrating an example of a first diaphragm structure used in an axial motion mechanism of the measuring probe.

As shown in FIG. 4A, each of the first diaphragm structures 314 and 315 is an elastically-deformable member having a generally disk shape. An example of a material for the first diaphragm structures 314 and 315 is phosphor bronze (other materials may be used). Here, the first diaphragm structure 315 is identical with the first diaphragm structure 314 (without being limited thereto, the first diaphragm structures 314 and 315 may have shapes different from each other). Thus, only the first diaphragm structure 314 will be described with reference to FIG. 4A.

As shown in FIG. 4A, the first diaphragm structure 314 is provided with three cutout portions 314D out of phase with one another by 120 degrees in the circumferential direction thereof. Due to the cutout portions 314D, a peripheral portion 314A, a rim portion 314B, and a central portion 314C are provided from the outer side toward the inner side of the first diaphragm structure 314 in the radial direction. The peripheral portion 314A is positioned at the outermost peripheral portion of the first diaphragm structure 314 and is a portion to be fixed to the main body housing 308. The rim portion 314B has a strip shape in the circumferential direction due to the two adjacent cutout portions 314D and is disposed on the inner side of the peripheral portion 314A. Opposite ends of the rim portion 314B are coupled to the peripheral portion 314A and the central portion 314C, respectively. The central portion 314C is a portion for supporting the moving member 312 and disposed on the inner side of the rim portion 314B. Displacement of the moving member 312 with respect to the main body housing 308 causes the central portion 314C of the first diaphragm structure 314 to move in a vertical direction and causes the rim portion 314B to be elastically deformed. Note that the configuration of the first diaphragm structure is not limited to the shape described in the present embodiment (this applies also to the second diaphragm structure to be described later).

On the other hand, a scale bracket 324 is disposed on an upper end 312A of the moving member 312 as shown in FIGS. 2A and 2B. A reference member 326 is disposed on the scale bracket 324. The displacement detector 328 that detects reflected light from the reference member 326 is disposed to face the reference member 326. Note that the displacement detector 328 incorporates a light source for emitting light to the reference member 326. Incremental patterns having different reflectances for light from the light source are provided at predetermined intervals in the Z direction on a surface of the reference member 326 closer to the displacement detector 328. In other words, the reference member 326 is a reflective solid-state scale. The reference member 326, the displacement detector 328, and the light source together constitute a photoelectric linear encoder which outputs a two-phase sinusoidal signal. Thus, the main body housing 308 is provided with the displacement detector 328 for detecting displacement of the moving member 312. Corresponding to the displacement of the moving member 312, the displacement detector 328 outputs a periodic signal repeated in predetermined cycles of incremental patterns (i.e., the displacement detector 328 outputs a relative position detection signal that allows detection of the relative position of the moving member 312). This periodic signal is wave-shaped by the signal processing circuit 329. A Z-two-phase sine wave for obtaining displacement of the reference member 326 in the Z direction is outputted from the signal processing circuit 329.

As shown in FIGS. 2A and 2B, another light source 318 is provided on the inner side surface of the main body housing 308. A beam splitter 320 that directs light outputted from the light source 318 in the Z direction is supported by a supporting member 319 so as to face the light source 318 (note that the supporting member 319 is fixed to the inner side of the main body housing 308). The light directed in the Z direction (light passing through an optical axis GA) passes through the hollow portion 312B of the moving member 312 and is reflected by a reference member 316 (which is a reflecting mirror for reflecting light) provided on an end of the rotating member RP opposite to the stylus 306 (i.e., the probe main body 302 is provided with the light source 318 for causing light to be incident on the reference member 316 along the optical axis OA). The reflected light passes through the beam splitter 320 and the orientation detector 322 disposed on the top surface of the main body housing 308 on the inner side (i.e., the orientation detector 322 is incorporated in the probe main body 302) detects the light reflected from the reference member 316. Thus, displacement (tilt) of the reference member 316 changes the position of the reflected light detected by the orientation detector 322. This allows the orientation detector 322 to detect the displacement of the reflected light, which is reflected from the reference member 316, from the optical axis OA. Thus, the orientation detector 322 can detect the displacement (tilt) of the reference member 316 corresponding to the rotary movement of the stylus 306. The optical axis OA is provided so as to pass through the rotation center RC of the rotary motion mechanism 334 (i.e., the central axis O coincides with the optical axis OA).

As shown in FIGS. 2A and 2B, the reference member 316 has a concave surface so as to reduce an amount of displacement from the optical axis OA in the reflected light detected by the orientation detector 322 and thus achieve the miniaturization of the orientation detector 322. An output from the orientation detector 322 is also inputted to the signal processing circuit 329. The output from the orientation detector 322 is then wave-shaped by the signal processing circuit 329. A displacement voltage (XY displacement voltage) based on the displacement of the reflected light in the XY direction from the optical axis OA, which is caused by the change in the orientation of the reference member 316, is outputted from the signal processing circuit 329.

As shown in FIGS. 2A and 2B, the probe module 304 includes: a module cover 332; the module housing 330; and the rotary motion mechanism 334. Note that in the present embodiment, the module cover 332 and the module housing 330 together constitute a rotary element housing member.

As shown in FIGS. 2A and 2B, the module cover 332 has a flange shape with an opening 332A at its center. The module cover 332 is a member corresponding to the flange portion 312E. More specifically, three balls 332B are disposed at intervals of 120 degrees in the circumferential direction of the module cover 332 so as to be each in contact with both of the pair of rollers 312F. Corresponding to the permanent magnets 312G, magnetic members (which may be permanent magnets) 332C to be attracted to the permanent magnets 312G are disposed so as to be out of phase with the balls 332B by 60 degrees.

As shown in FIGS. 2A and 2B, the three balls 332B are each in contact with the surfaces of the corresponding pair of rollers 312F. Thus, in a state where the permanent magnet 312G and the magnetic member 332C are being attracted to each other by a predetermined force, the module cover 332 is seated on (in contact with) the flange part 312E at six points. In other words, the module cover 332 and the flange part 312E can be coupled to each other while achieving high positioning accuracy. More specifically, the module cover 332 and the flange member 312E together constitute a kinematic joint, which is a detachable coupling mechanism (it is referred to also as a kinematic coupling). Such a kinematic joint allows for a high degree of positioning reproducibility even when attachment and detachment between the probe module 304 and the flange portion 312E are repeatedly performed. When a large force is applied to the probe module 304 from a lateral direction (direction perpendicular to the Z direction), the probe module 304 can drop off from the flange portion 312E (including not only a case where no balls 332B are in contact with any of the rollers 312F but also a case where apart of the balls 332B is not in contact with the corresponding rollers 312F) to prevent the breakage of the probe main body 302 (therefore, the predetermined attracting force between the permanent magnet 312G and the magnetic member 332C is set to be a force corresponding to the aforementioned large force). Note that the kinematic joint may be a combination of V-grooves and balls without being limited to the combination of the rollers and the balls. While employing the combination of the rollers and the balls, the order of their arrangement may be reversed. In other words, the present invention is not limited to the combination of the rollers and the balls as long as seating at six points can be achieved.

As shown in FIGS. 2A and 2B, the module housing 330 is a member having a generally cylindrical shape with an opening 330A at a lower end thereof. The module housing 330 supports the rotary motion mechanism 334 radially inside thereof.

As shown in FIGS. 2A and 2B, the rotary motion mechanism 334 is housed in the module housing 330 except for a flange member 342. The flange member 342 is coupled to the stylus 306 without penetrating into the stylus 306. As shown in FIGS. 2A and 2B, the rotary motion mechanism 334 includes: the rotating member RP; and a second diaphragm structure 340 that allows the rotating member RP to be displaced with respect to the module housing 330.

As shown in FIGS. 2A and 2B, the rotating member RP is a member supported by the second diaphragm structure 340 and includes a balancing member 338, an upper member 336, and the flange member 342.

As shown in FIGS. 2A and 2B, the balancing member 338 is disposed above the second diaphragm structure 340 and has a weight corresponding to the stylus 306 (more specifically, the rotating member RP has the balancing member 338 on the side opposite to the stylus 306 with respect to a rotation center RC of the rotary motion mechanism 334). Appropriately setting the balancing member 338 (or adjusting a distance between the rotation center RC and the balancing member 338 as will be described later) allows the center of gravity of the members, including the stylus 306, supported by the rotating member RP to coincide with the rotation center RC. This can prevent the central axis of the stylus 306 from tilting from the axial direction O even when the measuring probe 300 is in the horizontal position, for example. In other words, the stylus 306 can stay at the center in a measurement range of the orientation detector 322 even when the orientation of the measuring probe 300 itself is changed. This allows the employment of a simpler, smaller, higher-resolution orientation detector 322. A reference member 316 is provided on the upper end of the balancing member 338 (end of the rotating member RP opposite to the stylus 306). Note that a distance between a side surface 338B of the balancing member 338 and an inner side surface 330B of the module housing 330 is determined to regulate a tilt (displacement) of the balancing member 338 so that an amount of deformation in the second diaphragm structure 340 falls within the range of elastic deformation. In other words, it can be said that the probe module 304 includes the module housing 330 and the balancing member 338 together serving as a second limiting member for limiting an amount of deformation in the second diaphragm structure 340 within the range of elastic deformation.

Figure 5A:
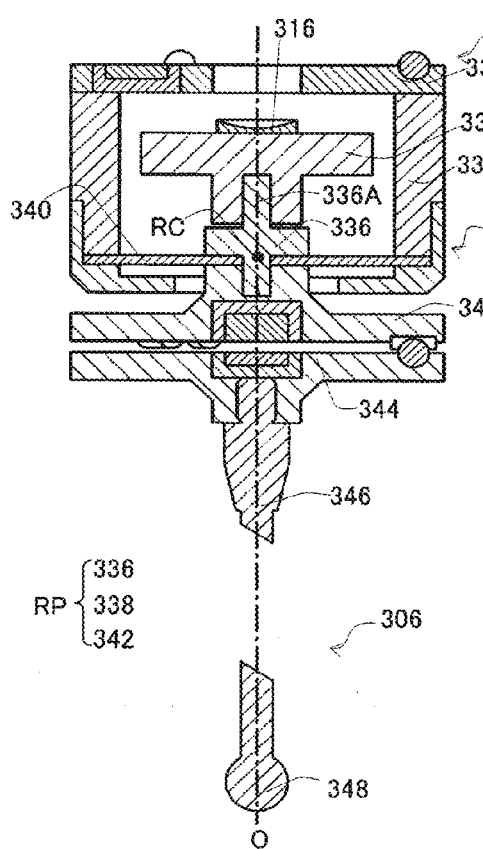
FIG. 5A is a schematic diagram illustrating a cross section of a probe module before a balancing member is moved.
Figure 5B:
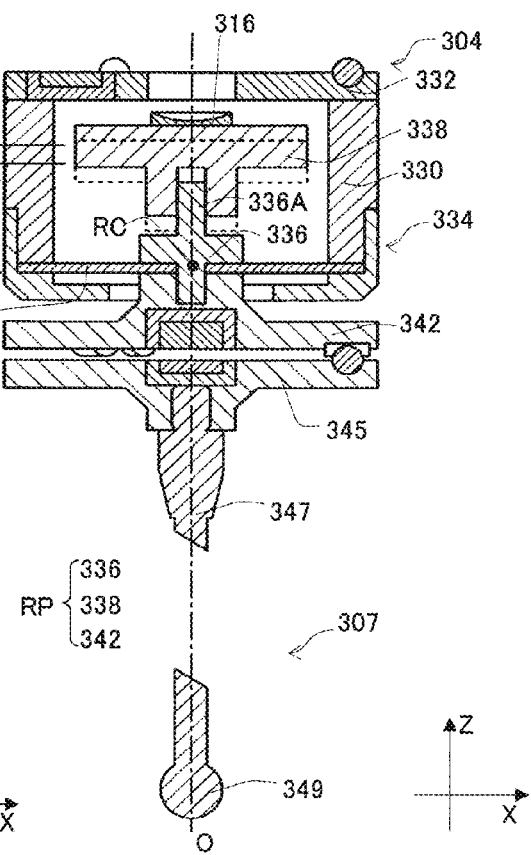
FIG. 5B is a schematic diagram illustrating a cross section of the probe module after the balancing member is moved.
Figure 5C:
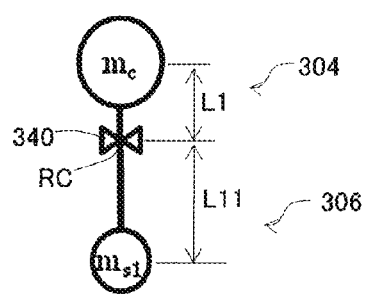
FIG. 5C is a functional diagram corresponding to FIG. 5A.
Figure 5D:
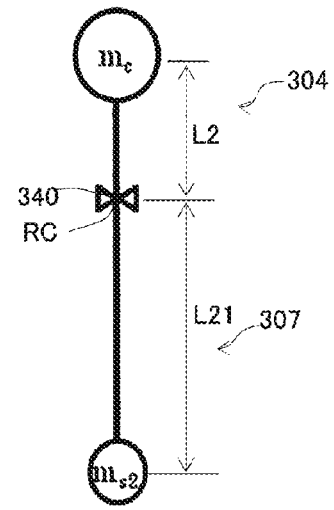
FIG. 5D is a functional diagram corresponding to FIG. 5B.

As shown in FIGS. 2A and 2B, the upper member 336 engages with the second diaphragm structure 340 to support the balancing member 338. Note that a protruding portion 336A of the upper member 336 is provided with an external thread. A depressed portion 338A of the balancing member 338 corresponding to the protruding portion 336A is provided with an internal thread. This allows a distance between the rotation center RC and the balancing member 338 to be adjusted by changing a state of screwing between the balancing member 338 and the upper member 336. For example, suppose a case where the center of gravity of the rotating member RP to which the stylus 306 is being coupled is made coincident with the rotation center RC by employing the balancing member 338 for the stylus 306 as shown in FIG. 5A. In such a case, when the length and mass of a stylus 307 are larger than those of the stylus 306, the center of gravity of the rotating member RP (member supported by the second diaphragm structure 340) to which the stylus 307 is being coupled can be made coincident with the rotation center RC by changing a distance between the balancing member 338 and the rotation center RC from L1 to L2 as shown in FIG. 5B. In other words, the probe module 304 employing the same balancing member 338 can be suitably used for a plurality of styluses 306. Alternatively, a plurality of probe modules 304, which are prepared by changing the positions of their balancing members 338 having the same mass, can be suitably used for a plurality of styluses 306 (i.e., the plurality of probe modules 304 may be prepared for the single probe main body 302 and different distances between the rotation center RC and the balancing member 338 can be set for each of the plurality of probe modules 304). Note that FIGS. 5C and 5D are schematic diagrams illustrating functions corresponding to FIGS. 5A and 5B, respectively. Here, the character $m_c$ denotes the mass of a portion of the member positioned above the rotation center RC. The characters L1 and L2 each denote a distance between the center of gravity of the portion of the member positioned above the rotation center RC and the rotation center RC. The characters $m_{s1}$ and $m_{s2}$ each denote the mass of a portion of the member positioned below the rotation center RC. The characters L11 and L21 each denote a distance between the center of gravity of the portion of the member positioned below the rotation center RC and the rotation center RC.

Figure 6A:
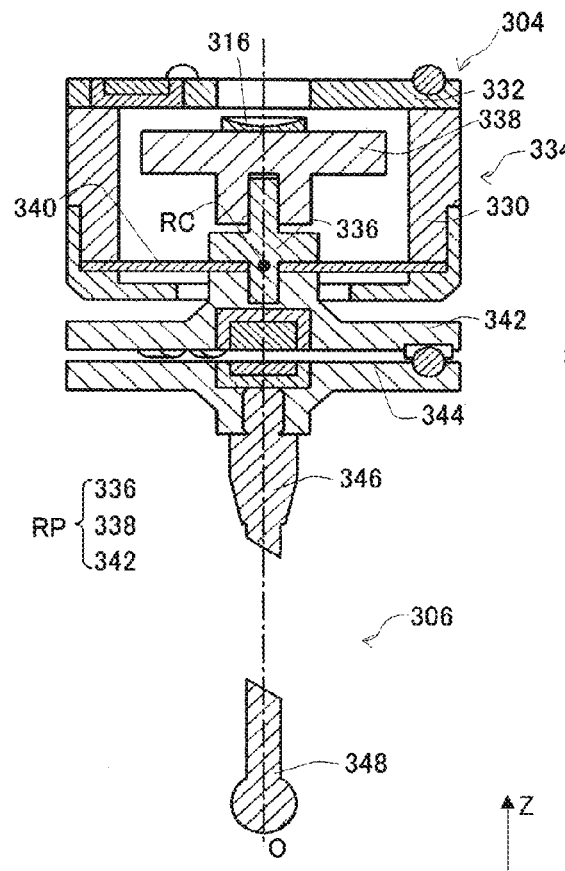
FIGS. 6A and 6B are schematic diagrams illustrating cross sections of probe modules having balancing members with mass different from each other.
Figure 6B:
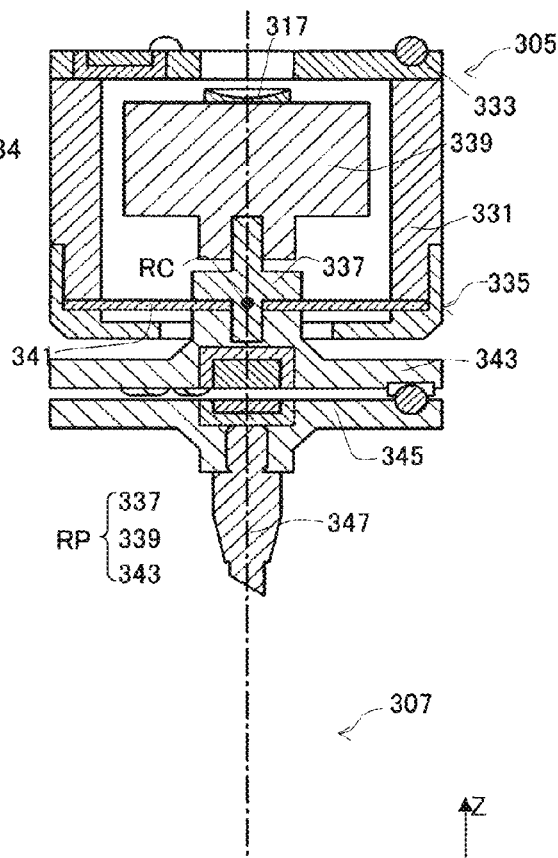
Figure 6C:
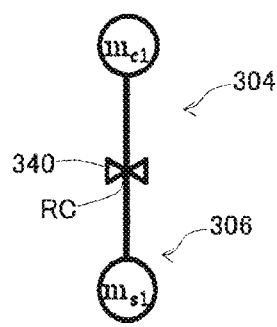
FIG. 6C is a functional diagram corresponding to FIG. 6A.
Figure 6D:
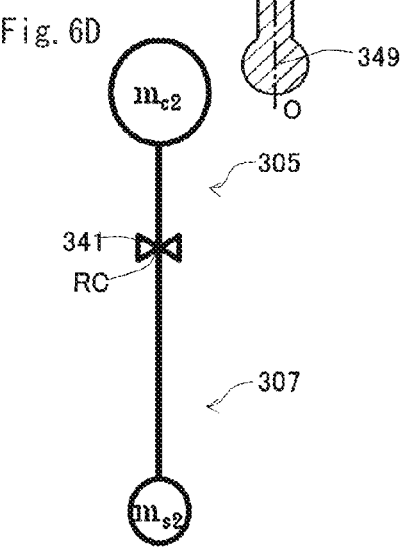
FIG. 6D is a functional diagram corresponding to FIG. 6B.

Alternatively, as shown in FIGS. 6A and 6B, probe modules 304 and 305 may be prepared for the single probe main body 302, and balancing members 338 and 339 may have different mass for each of the plurality of probe modules 304 and 305 (note that the number of the probe modules is not limited to two). For example, suppose a case where the center of gravity of the rotating member RP to which the stylus 306 is being coupled is made coincident with the rotation center RC by employing the balancing member 338 for the stylus 306 as shown in FIG. 6A. In such a case, when the length and mass of the stylus 307 are larger than those of the stylus 306, the center of gravity of the rotating member RP to which the stylus 307 is being coupled can be made coincident with the rotation center RC by employing the balancing member 339 having mass larger than that of the balancing member 338 as shown in FIG. 6B (furthermore, the distance between the balancing member 339 and the rotation center RC may be adjustable as shown in FIGS. 5A and 5B). Note that FIGS. 6C and 6D are schematic diagrams illustrating functions corresponding to FIGS. 6A and 6B, respectively. FIGS. 6C and 6D are shown with an indication method similar to that in FIGS. 5C and 5D.

FIGS. 7A and 7B are schematic diagrams illustrating functions when the probe modules 304 and 305 in FIGS. 6A and 6B are coupled to the probe main body 302, respectively. When a stylus to be employed is changed from the stylus 306 to the stylus 307, the employment of the probe module 305 corresponding to the stylus 307 causes a change in weight supported by the probe main body 302, thereby resulting in a difference in initial position (zero point) detected by the displacement detector 328 by a distance L. Such a difference in initial position occurs only in the Z direction. Thus, the replacement by the stylus 307 can be performed without deteriorating detection accuracy in the Z direction by employing, as the displacement detector 328, a liner encoder having a long range (long detection range) in the Z direction and capable of detecting positions with a high resolution.

Figure 4B:
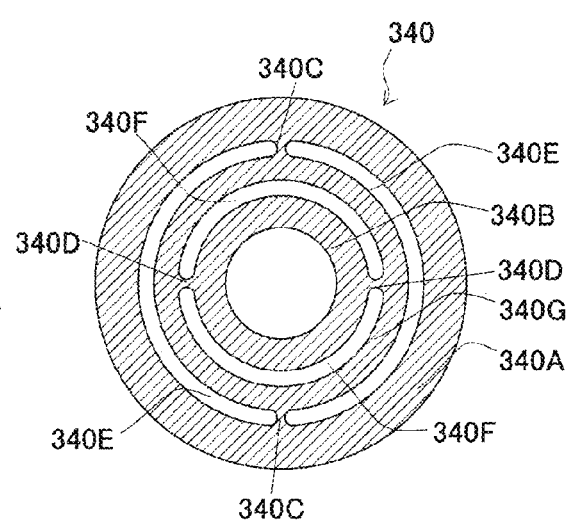
FIG. 4B is a schematic diagram illustrating an example of a second diaphragm structure used in a rotary motion mechanism of the measuring probe.

As shown in FIG. 4B, the second diaphragm structure 340 is also an elastically-deformable member having a generally disk shape. An example of a material for the second diaphragm structure 340 is phosphor bronze (other materials may be used). The second diaphragm structure 340 is provided with two arc-shaped cutout portions 340E out of phase with each other by 180 degrees in the circumferential direction thereof, and two hinge portions 340C are formed therebetween. Two arc-shaped cutout portions 340F out of phase with each other by 180 degrees in the circumferential direction are further provided on a radially inner side of the cutout portions 340E and two hinge portions 340D are formed therebetween. Due to the cutout portions 340E and 340F, a peripheral portion 340A, a rim portion 340G, and a central portion 340B are provided from the outer side toward the inner side of the second diaphragm structure 340 in the radial direction.

As shown in FIG. 4B, the peripheral portion 340A is positioned at the outermost peripheral portion of the second diaphragm structure 340 and is a portion to be fixed to the module housing 330. The rim portion 340G has a strip shape in the circumferential direction due to the cutout portions 340E and 340F provided on both sides thereof in the radial direction. The rim portion 340G is disposed on the inner side of the peripheral portion 340A. The rim portion 340G is connected to the peripheral portion 340A via the hinge portion 340C and connected to the central portion 340B via the hinge portion 340D. The central portion 340B is a portion for supporting the upper member 336 and disposed on the inner side of the rim portion 340G. The cutout portions 340E and 340F are out of phase with each other by 90 degrees. Thus, the central portion 340B is tiltable (rotatable) in two directions perpendicular to each other with the center of the second diaphragm structure 340 (rotation center RC) used as an axis.

Figure 4C:
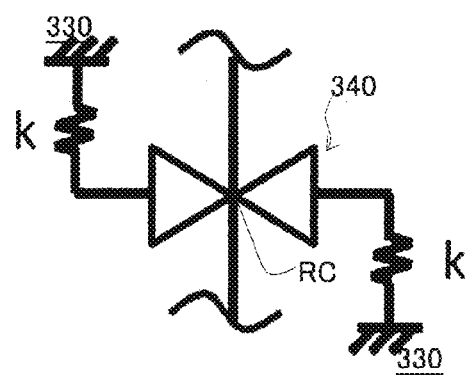
FIG. 4C is a functional diagram of the second diaphragm structure used in the rotary motion mechanism.

FIG. 4C is a schematic diagram illustrating a function of the second diaphragm structure 340. Note that the character k denotes a restoring force per unit displacement (angle) when the central portion 340B is displaced (rotated). More specifically, when the plurality of probe modules 304 are prepared for the single probe main body 302, a different restoring force per unit displacement when the rotating member RP is displaced can be set for each of the plurality of probe modules 304. Thus, the probe module 304 having an appropriate restoring force can be employed for each of the styluses 306.

As shown in FIGS. 2A and 2B, the flange member 342 is supported by the upper member 336 while interposing the second diaphragm structure 340 therebetween. Here, a distance between an upper end 342C of the flange member 342 and a lower end 330AA of the opening 330A is determined to regulate upward displacement of the flange member 342 in the Z direction so that an amount of deformation in the pair of first diaphragm structures 314 and 315 falls within the range of elastic deformation. In other words, it can be said that the probe module 304 includes the module housing 330 and the flange member 342 together serving as a first limiting member for limiting an amount of deformation in the pair of first diaphragm structures 314 and 315 within the range of elastic deformation. As a matter of course, the stylus 306 is configured to drop off when an excessively large load is applied to the stylus 306 or the probe module 304 before the first limiting member (including a second limiting member to be described later) acts. Along a periphery on a lower end of the flange member 342, one pair of rollers 342A is provided at each of positions at intervals of 120 degrees in the circumferential direction thereof, i.e., totally three pairs of rollers 342A are provided at intervals of 120 degrees in the circumferential direction thereof. Three permanent magnets 342B are provided on the central axis O. Note that the axial direction of the pair of rollers 342A coincides with an approximately radial direction toward the center of the flange member 342.

As shown in FIGS. 2A and 2B, the stylus 306 includes: a flange part 344; a rod part 346; and the contact part 348.

As shown in FIGS. 2A and 2B, the flange part 344 is a member corresponding to the flange member 342. More specifically, three balls 344A are disposed at intervals of 120 degrees in the circumferential direction of the flange part 344 so as to be each in contact with the pair of rollers 342A. A magnetic member 344B (which may be a permanent magnet) to be attracted to the permanent magnet 342B is disposed in the flange part 344 to face the permanent magnet 342B.

As shown in FIGS. 2A and 2B, the three balls 344A are each in contact with the surfaces of the corresponding pair of rollers 342A. Thus, in a state where the permanent magnet 342B and the magnetic member 344B are being attracted to each other by a predetermined force, the flange member 342 is seated on the flange part 344 at six points. In other words, the flange member 342 and the flange part 344 can be coupled to each other while achieving high positioning accuracy. More specifically, the flange part 344 and the flange member 342 together constitute a kinematic joint, which is a detachable coupling mechanism. Such a kinematic joint allows for a high degree of positioning reproducibility even when attachment and detachment between the stylus 306 and the flange member 342 are repeatedly performed. When a large force is applied to the stylus 306 from a lateral direction (direction perpendicular to the axial direction O), the stylus 306 can drop off from the flange member 342 to prevent the breakage of the probe module 304.

As shown in FIGS. 2A and 2B, a base end of the rod part 346 is attached to the flange part 344. A tip of the rod part 346 is provided with the spherical contact part 348. Note that when no displacement occurs in the stylus 306 in a reference state, the direction of the central axis of the stylus 306 coincides with the Z direction (axial direction O).

A probe signal processing part 530 will next be described with reference to FIG. 3.

As shown in FIG. 3, the probe signal processing part 530 includes: an analog-to-digital (A/D) circuit 532; an FPGA 534; and a counter circuit 536. The A/D circuit 532 performs analog-to-digital conversion of the Z-two-phase sine wave and the XY displacement voltage, which are inputted analog signals, in order to obtain respective digital signals thereof. More specifically, as the number of bits in this analog-to-digital conversion increases, a higher dynamic range and higher sensitivity to the displacement of the stylus 306 can be achieved. The FPGA 534 converts the XY displacement voltage, which is a digital signal, into a displacement signal and outputs the signal to a position calculating part 550. The FPGA 534 also converts the Z-two-phase sine wave, which is a digital signal, into a Z-two-phase square wave and outputs the Z-two-phase square wave to the counter circuit 536. The counter circuit 536 measures the Z-two-phase square wave to obtain the displacement in the Z direction and outputs the obtained result to the position calculating part 550.

In the present embodiment the axial motion mechanism 310 is incorporated in the probe main body 302 and the rotary motion mechanism 334 is incorporated only in the probe module 304. In view of this, suppose a case where at least the rotary motion mechanism 334 should be changed from the perspective of its performance when the stylus 306 is replaced with the stylus 307, for example. In such a case, simply by replacing the probe module 304 without changing the probe main body 302, a force applied to the object W to be measured from the contact part 348 can be set at a desired measuring force, for example. Consequently, adequate detection sensitivity and a restoring force (a force to restore the displacement of the stylus 306) can be obtained in the measuring probe 300. Conversely, replacing the probe main body 302 with respect to the same probe module 304 can be easily performed. Moreover, when only the rotary motion mechanism 334 is broken or degraded in its performance, the function of the measuring probe 300 can be maintained simply by replacing the probe module 304. At the same time, the detection sensitivity by the rotary motion mechanism 334, which is positioned closer to the stylus 306, can be improved.

In the present embodiment, the probe main body 302 and the probe module 304 are detachably coupled to each other with the rollers 312F and the balls 332B capable of positioning to each other. This allows the coupling positions to be reproduced with high accuracy even when attachment and detachment of the probe module 304 are repeatedly performed. Moreover, by positioning the balls 332B at the same positions in the plurality of probe modules 304, the plurality of probe modules 304 can be easily attached to or detached from the probe main body 302 and a high degree of positional reproducibility can be achieved. Needless to say, the first engagement part capable of positioning is not limited to the combination of the rollers and the balls.

In the present embodiment, in order to change the position of the stylus 306 in the XYZ direction, the axial motion mechanism 310 performs a movement in the Z direction and the rotary motion mechanism 334 performs a movement in the XY direction in principle. Thus, the displacement of the stylus 306 can be separated into components of the Z direction and the XY direction, thereby allowing displacements in the Z direction and the XY direction to be easily detected independently of each other. The position calculation can be therefore simplified. Also, detection accuracy in the Z direction and that in the XY direction can be set independently of each other.

In the present embodiment, the axial motion mechanism 310 is supported by the pair of identical first diaphragm structures 314 and 315. Thus, occurrence of the displacement of the axial motion mechanism 310 in a direction other than the Z direction can be reduced, thus ensuring high movement accuracy in the Z direction. Also, increased responsivity can be achieved when compared with a case where an air bearing, or the like, is concurrently used for the guiding of the moving member. Note that the present invention is not limited thereto. Instead of employing the pair of identical first diaphragm structures, a single first diaphragm structure or three or more first diaphragm structures may be used. Alternatively, the first diaphragm structures may have shapes different from each other.

In the present embodiment, a plurality of probe modules 304 may be prepared for the single probe main body 302, and a different restoring force per unit displacement when the rotating member RP is displaced may be set for each of the plurality of probe modules 304. Thus, a restoring force individually corresponding to the styluses 306 or the objects W to be measured can be set, displacement in the XY direction can be detected with high sensitivity, and the detection range can be expanded easily. Also, damage to the object W to be measured, which is caused by the contact part 348, can be lessened. Note that the present invention is not limited thereto. A restoring force per unit displacement when the rotating member RP is displaced may not be changed for every probe module.

In the present embodiment, a distance between the rotation center RC and the balancing member 338 can be adjusted. Thus, even when the same balancing member 338 is employed for a plurality of styluses 306, the center of gravity of the rotating member RP to which any one of the styluses 306 is coupled can be made coincident with the rotation center RC by adjusting the position of the balancing member 338. In other words, the number of types of the balancing member 338 can be reduced, thus reducing the manufacturing and management costs of the balancing member 338. By preparing a plurality of probe modules 304 for the single probe main body 302, the plurality of probe modules 304 each having different balance can be obtained with the rotating members RP configured by the same elements. Thus, a cost reduction in the probe module 304 can be achieved. Note that the present invention is not limited thereto. The position of the balancing member may be unadjustable.

In the present embodiment, a plurality of probe modules 304 may be prepared for the single probe main body 302, and the balancing members 338 can have different mass for each of the plurality of probe modules 304. Thus, by selecting the probe module 304 having the balancing member 338 corresponding to each of the styluses 306, the center of gravity of the rotating member RP to which the stylus 306 is coupled can be made coincident with the rotation center RC. If adjustment in the position of the balancing member 338 is possible in a finer manner, probe modules 304 more accurately adaptable to many more styluses 306 can be provided for the single probe main body 302.

In the present embodiment, the displacement detector 328 for detecting displacement of the moving member 312 is provided to the main body housing 308. More specifically, the displacement detector 328 supported by the main body housing 308 detects displacement of the moving member 312 (which moves in the Z direction without moving in the XY direction in principle) supported also by the main body housing 308. Thus, the displacement detector 328, even if it is not an expensive detector, can purely detect unidirectional displacement of the moving member 312 with respect to the main body housing 308. More specifically, the displacement detector 328 can detect displacement of the moving member 312 with a high resolution and can easily correct the displacement of the moving member 312. Also, a linear encoder, or the like, can be easily employed and the moving member 312 (i.e., the stylus 306) can have a long stroke. Note that the present invention is not limited thereto. The displacement detector may not be provided to the main body housing.

In the present embodiment, the displacement detector 328 outputs a relative position detection signal (a periodic signal repeated in predetermined cycles) that allows the detection of the relative position of the moving member 312. Thus, constituting a photoelectric incremental linear encoder with the displacement detector 328 allows the avoidance of a phenomenon in which detection sensitivity varies according to a position to which the moving member 312 is moved while ensuring an extremely long detection range (dynamic range). Also, subjecting the relative position detection signal to analog-to-digital conversion with high bit number allows the detection of position in the Z direction with a higher resolution. Note that the displacement detector is not limited thereto. The displacement detector may be configured to detect not an incremental pattern but an absolute pattern. In other words, the displacement detector may be configured to output an absolute position detection signal that allows the detection of the absolute position of the moving member. Alternatively, the displacement detector may include an exciting coil and a differential coil to constitute a differential transformer transducer.

In the present embodiment, the reference member 316 is provided on the end of the rotating member RP opposite to the stylus 306, and the orientation detector 322 is incorporated in the probe main body 302 including the main body housing 308. More specifically, since no orientation detector 322 is provided in the probe module 304, the probe module 304 itself can be downsized and a cost reduction can be therefore achieved. The reference member 316 is incorporated in the probe module 304. Thus, when compared with a configuration in which the reference member penetrates into the probe main body, a distance from the reference member 316 to the contact part 348 can be reduced. Therefore, a calculation error of the displacement of the contact part 348, which is calculated from the displacement of the reference member 316, can be reduced and thus the position of the contact part 348 can be obtained with high accuracy.

In the present embodiment, the light source 318 that causes light to be incident on a reflecting mirror, or the reference member 316, along the optical axis OA is provided, and the orientation detector 322 detects the displacement of the reflected light, which is reflected from the reflecting mirror, from the optical axis OA. More specifically, since the orientation detector 322 performs detection in a contactless manner, the orientation detector 322 can detect the displacement of the rotating member RP with high sensitivity without inhibiting the rotary motion of the rotating member RP on which the reference member 316 is provided. Also, since the configuration for detecting the displacement of the rotating member RP is an optical lever and therefore simple, a cost reduction in the measuring probe 300 can be achieved. Note that the orientation detector is not limited thereto. A contact type orientation detector or a contactless type orientation detector utilizing magnetism, for example, may be employed.

In the present embodiment, the optical axis OA is provided so as to pass through the rotation center RC. Thus, a change in reflected light generated by the rotary movement of the rotating member RP contains no displacement component in the Z direction, and the displacement of the rotating member RP can be therefore detected with higher sensitivity. Note that the present invention is not limited thereto. The optical axis OA may be configured so as not to pass through the rotation center RC.

In the present embodiment, the probe main body 302 includes the main body housing 308 and the moving member 312, which are for limiting an amount of deformation in the pair of first diaphragm structures 314 and 315 within the range of elastic deformation. Also, the probe module 304 includes the module housing 330 and the flange member 342, which are for limiting an amount of deformation in the pair of first diaphragm structures 314 and 315 within the range of elastic deformation. Thus, even when excessively large impact is applied to the probe module 304 or the stylus 306 in a direction along which the kinematic joint cannot function, for example, plastic deformation, breakage, or breakdown of the first diaphragm structures 314 and 315 can be prevented from occurring. Note that the present invention is not limited thereto. The measuring probe may not include the member for limiting an amount of deformation in the first diaphragm structures within the range of elastic deformation.

Thus, in the present embodiment, detection sensitivity and a restoring force suitable for the stylus 306 can be obtained at a low cost.

Although the present invention has been described with reference to the above embodiment, the present invention is not limited thereto. In other words, modifications and design alterations can be made without departing from the scope of the present invention.

Although the orientation detector 322 is positioned above the pair of first diaphragm structures 314 and 315 in the above embodiment, for example, the present invention is not limited thereto. For example, the present invention may be configured as in the second embodiment shown in FIGS. 8A and 8B. The second embodiment is different from the first embodiment mainly in the position of an orientation detector. Thus, for components excluding those associated with the orientation detector, basically the first two digits of their reference numerals are simply changed from the first embodiment and the description thereof will be omitted.

In the second embodiment, as shown in FIGS. 8A and 8B, an orientation detector 372 is disposed between a rotary motion mechanism 384 and a pair of first diaphragm structures 364 and 365. Specifically, a moving member 362 includes a depressed portion 362C in a lower part, in the Z direction, of an area supported by the first diaphragm structure 364. A supporting member 369 extends from an inner side surface of a main body housing 358 so as not to be in contact with the depressed portion 362C. The orientation detector 372 and a beam splitter 370 are supported by the supporting member 369. Thus, even when the displacement of the rotating member RP is large, a distance between a reference member 366 and the orientation detector 372 can be kept short. The orientation detector 372 can be therefore downsized. Thus, a probe main body 352 can be further downsized. A distance between an upper end 362C1 of the depressed portion 362C and an upper end 369A of the supporting member 369 and a distance between an upper end 362DA of a flange portion 362D and a lower end 358AB of an opening 358A are determined to regulate displacement of the moving member 362 in the Z direction so that an amount of deformation in the pair of first diaphragm structures 364 and 365 falls within the range of elastic deformation. In other words, it can be said in the present embodiment that the probe main body 352 includes the main body housing 358, the moving member 362, and the supporting member 369 together serving as a first limiting member for limiting an amount of deformation in the pair of first diaphragm structures 364 and 365 within the range of elastic deformation.

Although the axial motion mechanism is incorporated in the probe main body and the rotary motion mechanism is incorporated in the probe module in the above embodiment, the present invention is not limited thereto. For example, the present invention may be configured as in the third embodiment shown in FIG. 9. The third embodiment is different from the above embodiment mainly in that an axial motion mechanism and a rotary motion mechanism are arranged in an opposite manner. Thus, for components mainly excluding those associated with the arrangement of the axial motion mechanism and the rotary motion mechanism, basically the first two digits of their reference numerals are simply changed from the above embodiment and the description thereof will be omitted.

Figure 9:
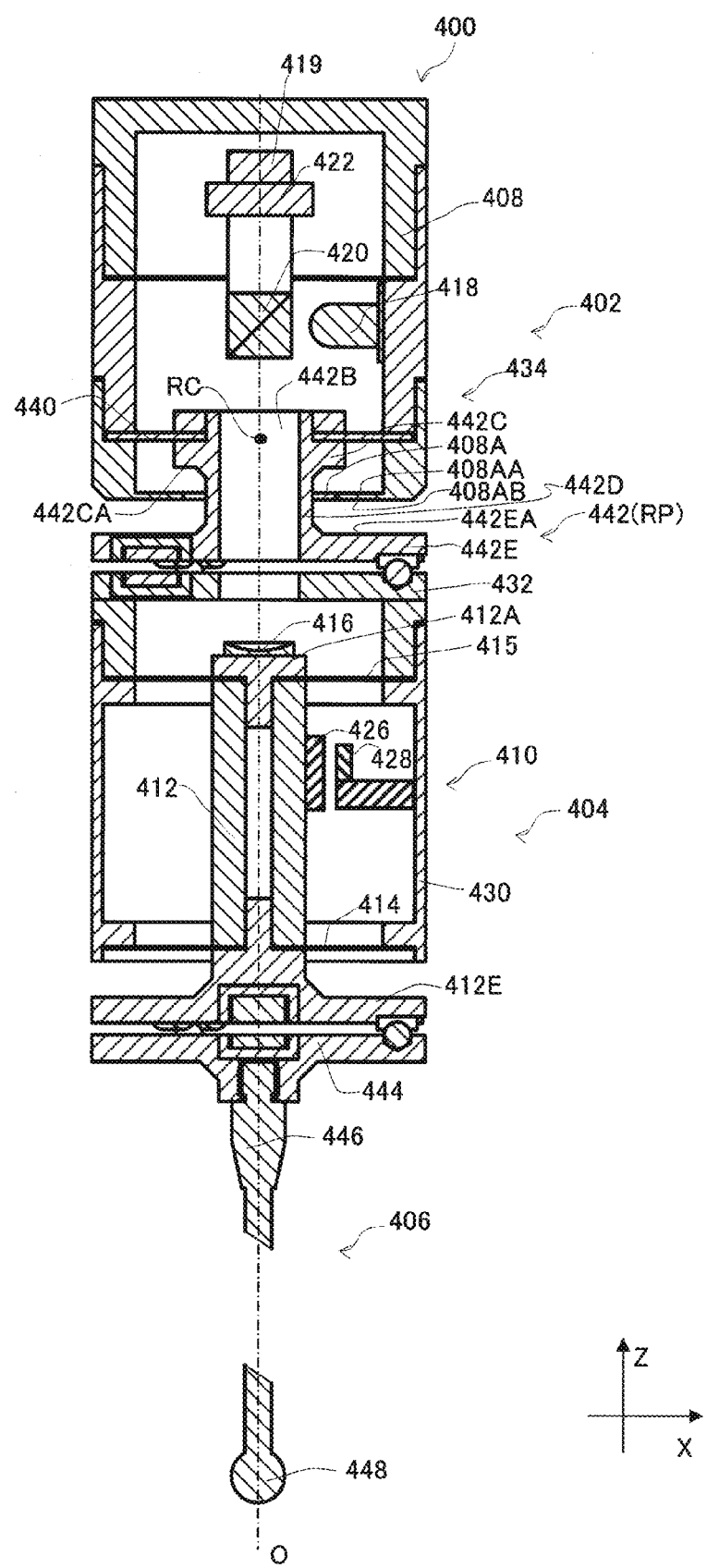
FIG. 9 is a schematic diagram illustrating a cross section of a measuring probe according to a third embodiment of the present invention.

In the third embodiment, as shown in FIG. 9, an axial motion mechanism 410 is incorporated in a probe module 404 and a rotary motion mechanism 434 is incorporated in a probe main body 402. A plurality of styluses 406 (having contact parts 448 of different materials, at different positions, or with different mass, for example) are prepared also in the present embodiment. Corresponding to the styluses 406, a plurality of probe modules 404 (the number thereof may not necessarily be the same as the number of the styluses 406) are prepared for the single probe main body 402.

As shown in FIG. 9, the rotary motion mechanism 434 is supported radially inside of a main body housing (rotary element housing member) 408. The rotary motion mechanism 434 is housed in the main body housing 408 except for a flange portion 442E of a rotating member 442. The flange portion 442E is coupled to the probe module 404 without penetrating into the probe module 404. As shown in FIG. 9, the rotary motion mechanism 434 includes: the rotating member 442; and a second diaphragm structure 440 that allows the rotating member 442 to be displaced with respect to the main body housing 408.

As shown in FIG. 9, the rotating member 442 has a generally annular shape having a hollow portion 442B around its axial center. More specifically, the rotating member 442 integrally includes: a thick portion 442C; a thin portion 442D; and the flange portion 442E from the upper part toward the lower part thereof in the Z direction. The second diaphragm structure 440 is coupled to the thick portion 442C. The thin portion 442D is formed below the thick portion 442C. Note that a diameter of an opening 408A of the main body housing 408 is set to be smaller than an outer diameter of the thick portion 442C. An outer diameter of the flange portion 442E is set to be larger than the diameter of the opening 408A. Here, a distance between a lower end 442CA of the thick portion 442C and an upper end 408AA of the opening 408A and a distance between an upper end 442EA of the flange portion 442E and a lower end 408AB of the opening 408A may be determined to regulate displacement of the rotating member 442 so that an amount of deformation in the second diaphragm structure 440 falls within the range of elastic deformation. Alternatively, a distance between an outer side surface of the thin portion 442D and an inner end face of the opening 408A may be determined to regulate displacement of the rotating member 442 so that an amount of deformation in the second diaphragm structure 440 falls within the range of elastic deformation (in this case, it can be said that the probe main body 402 includes the main body housing 408 and the rotating member 442 together serving as a second limiting member for limiting an amount of deformation in the second diaphragm structure 440 within the range of elastic deformation).

As shown in FIG. 9, the axial motion mechanism 410 is supported radially inside of the module housing (axial element housing member) 430. The axial motion mechanism 410 is housed in the module housing 430 except for a flange part 412E of the moving member 412. The flange part 412E is coupled to the stylus 406 without penetrating into the stylus 406. As shown in FIG. 9, the axial motion mechanism 410 includes: the moving member 412; and a pair of first diaphragm structures 414 and 415 that allows the moving member 412 to be displaced with respect to the module housing 430.

As shown in FIG. 9, a reference member 416, which is a reflecting mirror, is disposed on an upper end 412A of the moving member 412. Light passed through the hollow portion 442B of the rotating member 442 is reflected by the reference member 416. Also, a displacement detector 428 for detecting displacement of the moving member 412 is disposed inside the module housing 430 so as to face a reference member 426 provided on a side surface of the moving member 412 (i.e., the displacement detector 428 is incorporated in the probe module 404). Note that the displacement detector 428 incorporates a light source for emitting light to the reference member 426. Incremental patterns having different reflectances for light from the light source are provided at predetermined intervals in the axial direction O on a surface of the reference member 426 closer to the displacement detector 428. In other words, the reference member 426 is a reflective linear encoder scale. The reference member 426, the displacement detector 428, and the light source together constitute a photoelectric linear encoder (which may be of an incremental type or an absolute type) as in the first embodiment. Note that the displacement detector may not be incorporated in the probe module.

As described above, in the present embodiment, the axial motion mechanism 410 is incorporated in the probe module 404 and the rotary motion mechanism 434 is incorporated only in the probe main body 402. In view of this, suppose a case where at least the axial motion mechanism 410 should be changed from the perspective of its performance when the stylus 406 is changed, for example. In such a case, simply by replacing the probe module 404 without changing the probe main body 402, the displacement accuracy (rectilinear movement property) of the moving member 412 in the axial motion mechanism 410 can be improved due to an appropriate change in the detection range, for example (i.e., only the relative displacement of the moving member 412 with respect to the module housing 430 can be detected with high accuracy). Conversely, replacing the probe main body 402 with respect to the same probe module 404 can be easily achieved. Moreover, when only the axial motion mechanism 410 is broken or degraded in its performance, the function of a measuring probe 400 can be maintained simply by replacing the probe module 404.

In the present embodiment, a plurality of probe modules 404 may be prepared for the single probe main body 402, and a different restoring force per unit displacement when the axial motion mechanism 410 is displaced may be set for each of the plurality of probe modules 404. Thus, a restoring force individually corresponding to the styluses 406 or objects W to be measured can be set, unidirectional displacement with respect to the module housing 430 can be detected with high sensitivity, and the detection range can be expanded easily. Also, damage to the object W to be measured can be lessened.

Although the displacement detector is used to constitute the photoelectric incremental linear encoder in the above embodiment, the present invention is not limited thereto. For example, the present invention may be configured as in the fourth embodiment shown in FIG. 10. The fourth embodiment is different from the second embodiment mainly in a configuration around a displacement detector, and thus, for components mainly excluding those around the displacement detector, basically the first two digits of their reference numerals are simply changed from the above-described embodiment and the description thereof will be omitted.

Figure 10:
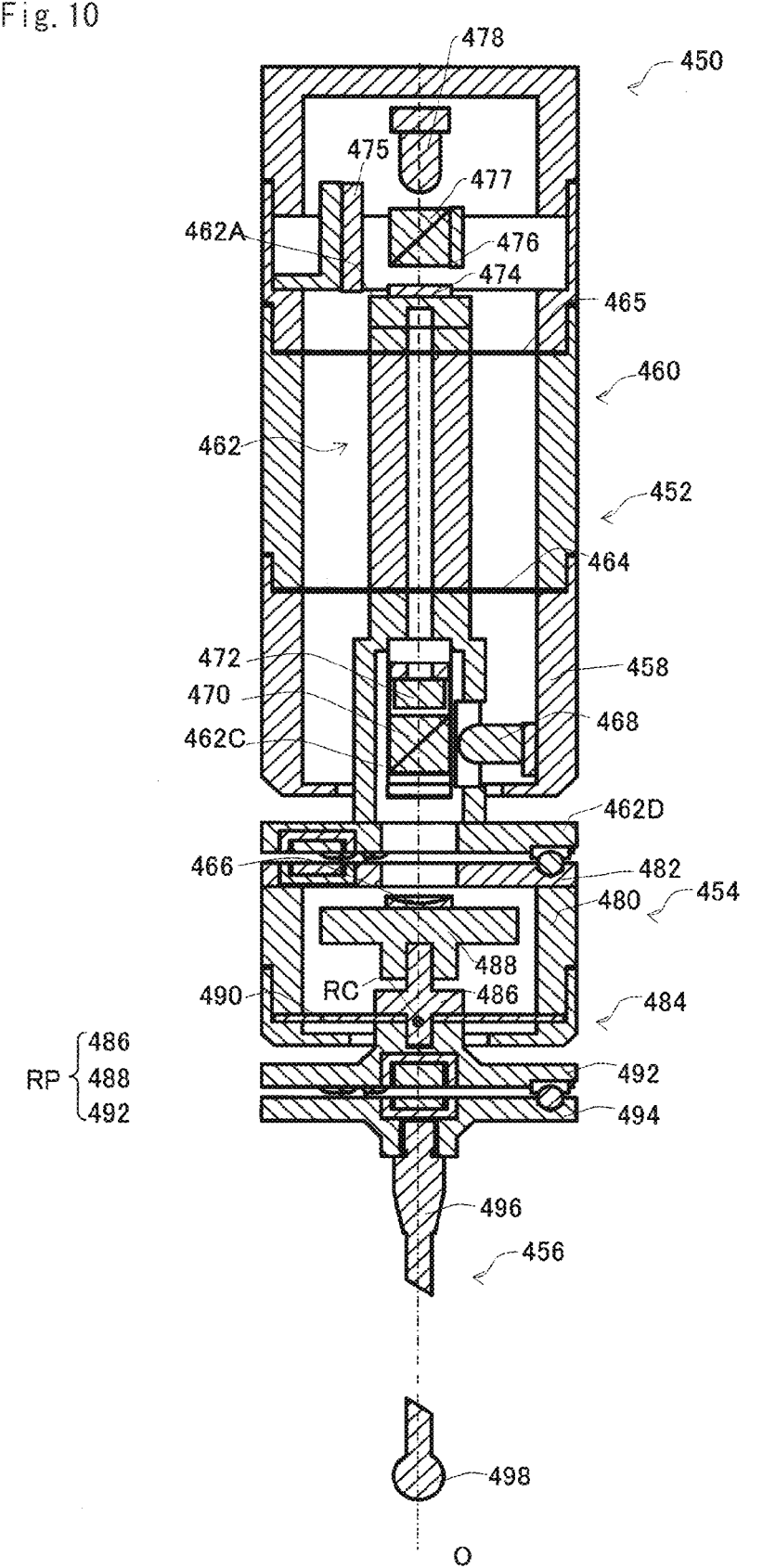
FIG. 10 is a schematic diagram illustrating a cross section of a measuring probe according to a fourth embodiment of the present invention.
Figure 11A:
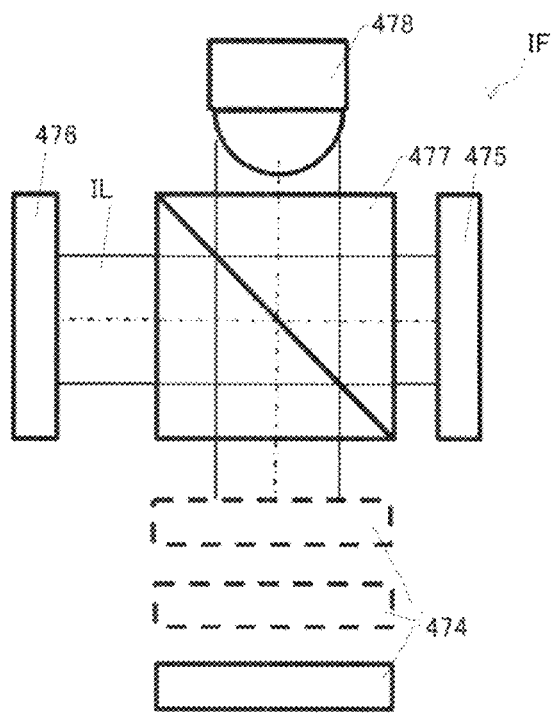
FIG. 11A is a schematic diagram illustrating arrangement of components in an interference optical system of FIG. 10.

In the fourth embodiment, as shown in FIGS. 10 and 11A, a probe main body 452 is provided with an interference optical system IF including: a light source (interference light source) 478; a reference mirror 475 for reflecting light from the light source 478; and a reference member (target mirror) 474 disposed in a moving member 462 for reflecting light from the light source 478. The interference optical system IF is capable of causing the interference of the reflected light from the reference mirror 475 and the reference member 474 to generate a plurality of interference fringes IL. The light source 478 and the reference mirror 475 are fixed to the inner side of a main body housing 458. The light source 478 and the reference member 474 disposed on an upper end 462A of the moving member 462 are aligned in the Z direction and a beam splitter 477 is disposed therebetween. The beam splitter 477 is also fixed to the inner side of the main body housing 458. These elements together constitute a Michelson interference optical system IF.

Figure 11B:
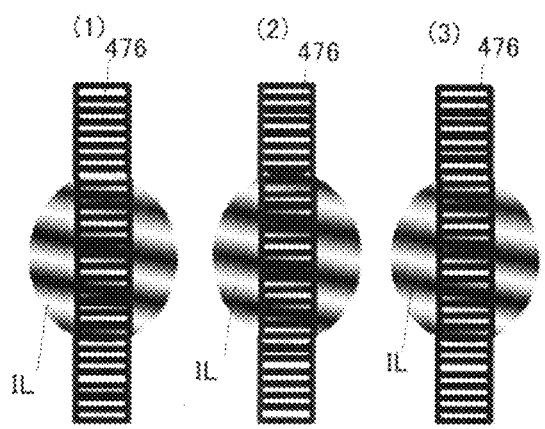
FIG. 11B shows how interfering light is incident on a displacement detector in the interference optical system.

As shown in FIGS. 10 and 11A, the beam splitter 477 causes light from the light source 478 to split in a direction toward the reference mirror 475. The beam splitter 477 also guides reflected light, which is reflected by the reference member 474, to a displacement detector 476 facing the reference mirror 475 and the beam splitter 477. Simultaneously, light reflected by the reference mirror 475 and passed through the beam splitter 477 is incident on the displacement detector 476. Thus, the displacement detector 476 can detect phase shifts PS of the plurality of interference fringes IL generated by the interference optical system IF as shown in FIG. 11B.

Figure 11C:
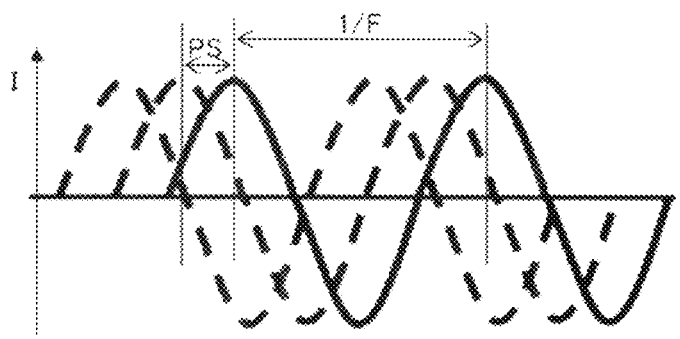
FIG. 11C is a chart showing phases and frequencies of interfering light detected by the displacement detector in the interference optical system.

FIG. 11C shows light intensity I of the plurality of interference fringes IL detected by the displacement detector 476. Here, the phase shift PS reflects the amount of movement of the reference member 474 in the Z direction. Thus, an amount of displacement of the moving member 462 in the Z direction can be obtained by obtaining the phase shift PS. Here, since the plurality of interference fringes IL are constituted by interfering light and periodic, the phase shift PS can be obtained with high accuracy (it can be said also in the present embodiment that the displacement detector 476 is configured to output a relative position detection signal that allows the detection of the relative position of the moving member 462).

Thus, in the present embodiment, the displacement of the moving member 462 in the Z direction can be obtained more accurately than in the above embodiment. Also, a period 1/F of the light intensity I for the plurality of interference fringes IL reflects a tilt of the reference member 474. Thus, a slight tilt of the moving member 462 in the XY direction can be obtained by obtaining a change in the period 1/F. In the present embodiment, since the slight tilt of the moving member 462 in the XY direction, which is associated with the displacement of the moving member 462 in the Z direction, can also be obtained from the output of the displacement detector 476, the displacement of a contact part 498 in the XY direction can be obtained with higher accuracy. Note that the interference optical system IF of the present embodiment is not the only system capable of obtaining a tilt of the moving member 462 in the XY direction. In principle, the displacement detectors described in the other embodiments can also obtain such a tilt in the XY direction. Moreover, the present embodiment is based on the assumption that only one wavelength is employed. If two or more wavelengths are employed, however, the displacement detector can output an absolute position detection signal that allows the detection of the absolute position of the moving member.

In the above embodiment, when the stylus to be employed is changed, the moving member is allowed to change its position in the axial direction O according to the mass of the stylus. However, the present invention is not limited thereto. For example, the present invention may be configured as in the fifth embodiment shown in FIG. 12A. The fifth embodiment is different from the second embodiment mainly in a coupling state between a probe main body and a probe module. Thus, for components mainly excluding those around the probe main body and the probe module, basically the first two digits of their reference numerals are simply changed from the second embodiment and the description thereof will be omitted.

In the fifth embodiment, a probe module 704 includes: balance weights 731C corresponding to the mass of a stylus 706; and counterbalance mechanisms 731 as shown in FIG. 12A. The counterbalance mechanisms 731 are supported by a main body housing (axial element housing member) 708 and configured to keep the stylus 706 and the balance weights 731C in balance in the Z direction via a module housing (rotary element housing member) 730. The counterbalance mechanisms 731 are detachable together with the probe module 704 from the probe main body 702.

Specifically, the main body housing 708 includes a cylindrical extended portion 708A extended downwardly in the Z direction so as to cover up to a peripheral lower end of the probe module 704 as shown in FIG. 12A. Three or more permanent magnets 708B are provided at equal intervals in the circumferential direction on the inner side of the extended portion 708A.

On the other hand, three or more counterbalance mechanisms 731 are provided in the module housing 730 so as to correspond to the positions and number of the permanent magnets 708B as shown in FIG. 12A. The counterbalance mechanism 731 includes: a supporting member 731A; a support shaft 731B; and a coupling shaft 731D. A magnetic member (which may be a magnet) 731AA attractable to the permanent magnet 708B is provided on an upper surface of the supporting member 731A. The support shaft 731B is fixed to the supporting member 731A and the balance weight 731C is eccentrically coupled to the support shaft 731B. The balance weight 731C is provided with the coupling shaft 731D in the direction perpendicular to the Z direction, and a tip of the coupling shaft 731D is coupled to the module housing 730.

Thus, in the present embodiment, a plurality of probe modules 704 can be prepared for a single probe main body 702 and the balance weight 731C can have different mass for the different probe modules 704. More specifically, by selecting, when the stylus 706 to be employed is changed, the probe module 704 provided with the balance weight 731C corresponding to the mass of the stylus 706, the main body housing 708 can directly receive an increase or decrease in the mass of the stylus 706. Thus, fluctuations in the initial position of a moving member 712 in the Z direction due to different styluses 706 can be prevented by this configuration. In the present embodiment, a range of motion for the moving member 712 can be reduced when compared with the above embodiment, thus allowing further miniaturization of the probe main body 702. At the same time, the detection range (dynamic range) can also be reduced, thus allowing the detection of an amount of displacement of the moving member 712 with a higher resolution.

FIG. 12B shows the sixth embodiment, which is a variation of the fifth embodiment. In this embodiment, a main body housing, instead of integrally including a cylindrical extended portion, has a configuration in which an annular-shaped supporting member 781A of a counterbalance mechanism 781 can be separated from a probe main body 752 as a part of a probe module 754.

Figure 13A:
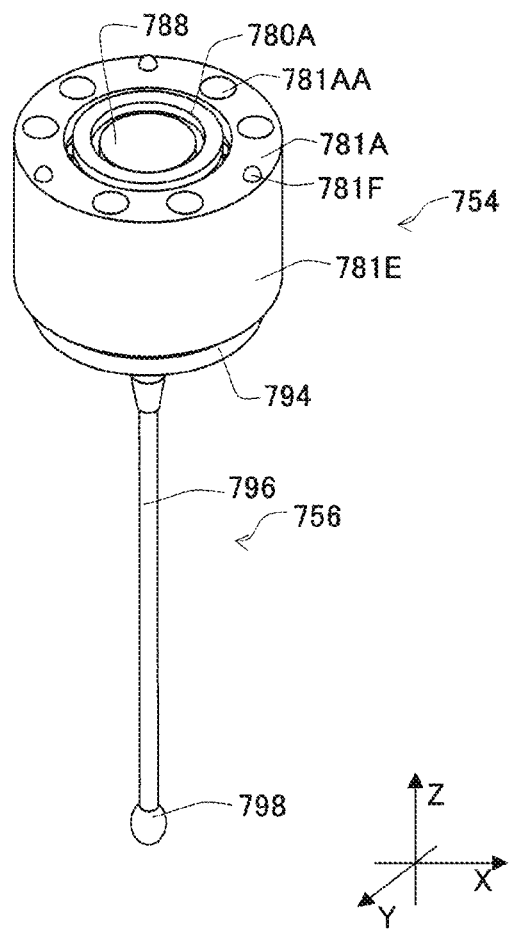
FIG. 13A is a perspective view illustrating a part of the measuring probe of FIG. 12B in which a stylus is coupled to a probe module.
Figure 13B:
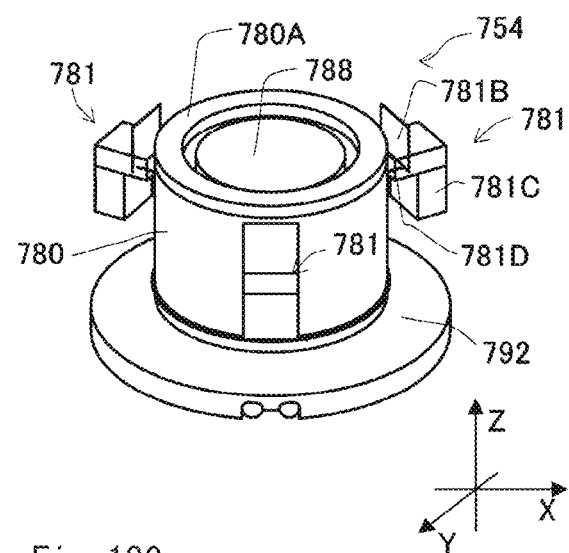
FIG. 13B is a perspective view illustrating counterbalance mechanisms in the measuring probe of FIG. 12B.

As shown in FIG. 12B, one pair of rollers 758B (first engagement part) is provided along a periphery of an opening 758A of a main body housing 758 at each of positions at intervals of 120 degrees in the circumferential direction thereof, i.e., totally three pairs of rollers 758B are provided at intervals of 120 degrees in the circumferential direction thereof. An annular-shaped permanent magnet 762E is provided in a flange part 762D of a moving member 762 positioned on a radially inner side of the rollers 758B. As shown in FIGS. 12B and 13A, balls 781F corresponding to the pairs of rollers 758B are provided in a flange part 781E of the supporting member 781A (note that the flange part 781E supports a support shaft 781B). Moreover, a magnetic member 780A corresponding to the permanent magnet 762E is provided in a module housing 780 as shown in FIGS. 12B, 13A, and 13B.

Figure 13C:
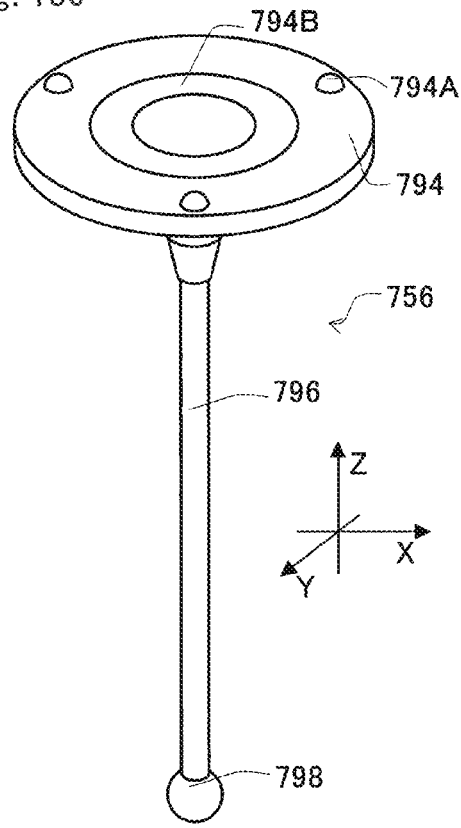
FIG. 13C is a perspective view illustrating the stylus in the measuring probe of FIG. 12B.

More specifically, unlike the fifth embodiment, in the present embodiment, a pair of rollers and a housing cover are eliminated from the flange part 762D, and the balls 781F corresponding to the pairs of rollers 758B are provided in the supporting member 781A outside the module housing 780. Thus, in the present embodiment, the weights of an axial motion mechanism 760 and a rotary motion mechanism 784 can be reduced. As shown in FIG. 13C, a magnetic member (which may be a permanent magnet) 794B corresponding to a permanent magnet 792B of a flange member 792 has a ring shape and is disposed on a radially inner side of a ball 794A of a flange part 794.

Although an orientation detector 422 is incorporated in the probe main body 402 in the third embodiment, the present invention is not limited thereto. For example, the present invention may be configured as in the seventh embodiment shown in FIG. 14. The seventh embodiment has a configuration in which the probe main body 402 in the third embodiment can be separated between a beam splitter 420 and the rotating member 442 in the axial direction O. In other words, the seventh embodiment is different from the third embodiment mainly in the position of an orientation detector. Thus, for components mainly excluding those associated with the position of the orientation detector, basically the first two digits of their reference numerals are simply changed from the third embodiment and the description thereof will be omitted.

Figure 14:
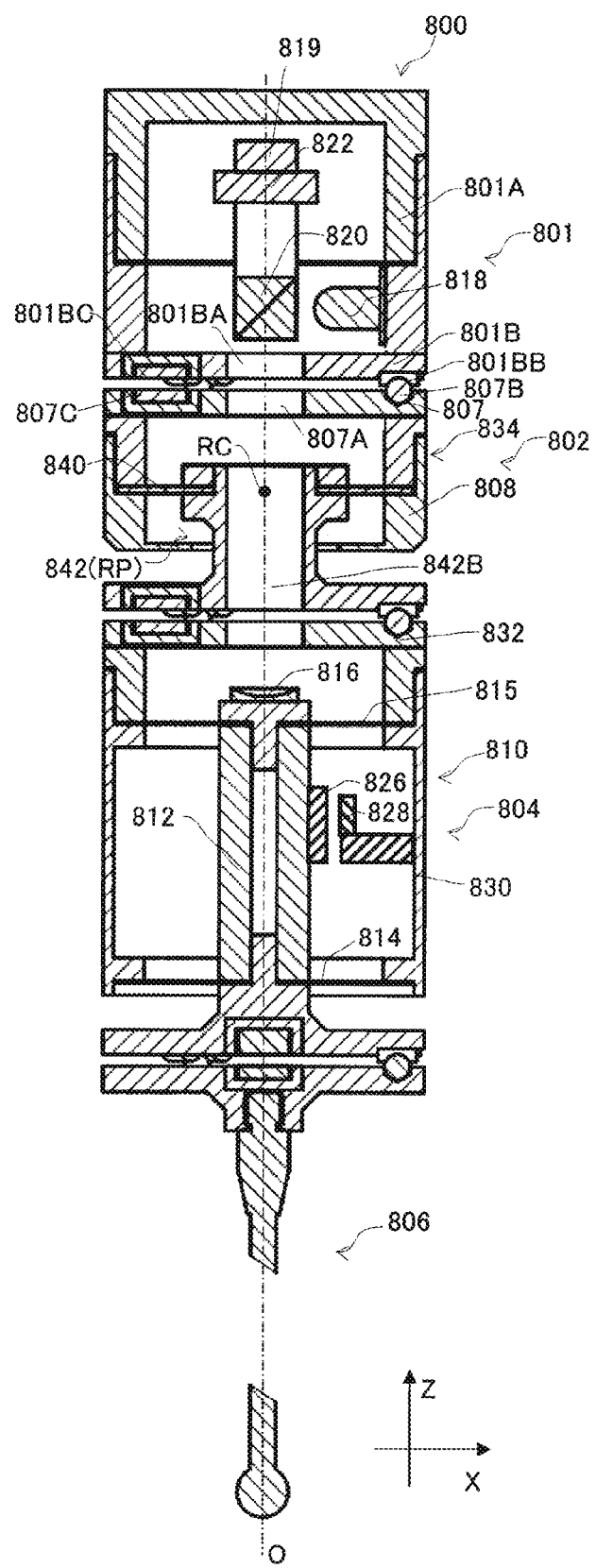
FIG. 14 is a schematic diagram illustrating a cross section of a measuring probe according to a seventh embodiment of the present invention.

In the seventh embodiment, there is provided, as shown in FIG. 14, a preceding module 801, which detachably couples and supports a main body housing 808 that supports a rotary motion mechanism 834 with rollers 801BB and balls 807B (second engagement part) capable of positioning the main body housing 808. An orientation detector 822 is incorporated in the preceding module 801.

Specifically, the preceding module 801 includes: a preceding housing 801A; a light source 818; a beam splitter 820; and the orientation detector 822 as shown in FIG. 14. The preceding housing 801A supports the light source 818, the beam splitter 820, and the orientation detector 822 radially inside thereof. The preceding housing 801A is provided with a lower cover 801B at a lower end thereof. The lower cover 801B has a flange shape with an opening 801BA at its center. Along a periphery on a lower end of the lower cover 801B, one pair of rollers 801BB is provided at each of positions at intervals of 120 degrees in the circumferential direction thereof, i.e., totally three pairs of rollers 801BB are provided at intervals of 120 degrees in the circumferential direction as shown in FIG. 14. Three permanent magnets 801BC are provided so as to be out of phase with the rollers 801BB by 60 degrees in the circumferential direction. In other words, the preceding housing 801A detachably couples and supports the main body housing 808 with the rollers 801BB and the balls 807B capable of positioning the main body housing 808. The preceding housing 801A houses the orientation detector 822.

As shown in FIG. 14, a probe main body 802 includes: an upper cover 807; the main body housing 808; and the rotary motion mechanism 834. As shown in FIG. 14, the upper cover 807 has a flange shape with an opening 807A at its center. The upper cover 807 is a member corresponding to the lower cover 801B (the opening 807A thus ensures the provision of an optical path for incident light to a reference member 816 and reflected light from the reference member 816). Moreover, three balls 807B are disposed at intervals of 120 degrees in the circumferential direction of the upper cover 807 so as to be each in contact with both of the pair of rollers 801BB. A magnetic member (which may be a permanent magnet) 807C is disposed so as to correspond to the permanent magnet 801BC. In other words, the lower cover 801B and the upper cover 807 together constitute a kinematic joint, which is a detachable coupling mechanism. Such a kinematic joint allows for a high degree of positioning reproducibility even when attachment and detachment between the lower cover 801B and the probe main body 802 are repeatedly performed.

As described above, in the present embodiment, only the rotary motion mechanism 834 is incorporated in the probe main body 802, and the light source 818, the beam splitter 820, and the orientation detector 822 are incorporated in the preceding module 801. Thus, only the rotary motion mechanism 834 can be changed easily and the preceding module 801 can also be changed easily. In other words, change in performance or replacement of the rotary motion mechanism 834 and that of the orientation detector 822 can be independently performed and the cost thereof can be reduced. Moreover, this enables, by directly attaching a probe module 804 to the preceding module 801 without attaching the probe main body 802 thereto, the testing for the rectilinear movement property of the probe module 804 with the use of an output of the orientation detector 822, for example. Although an axial motion mechanism 810 directly supports a stylus 806 in the present embodiment, the preceding module may be provided while the rotating member RP directly supports the stylus as in the first embodiment, etc. A displacement detector may also be incorporated in the preceding module.

Although no configuration for damping displacement of the stylus is shown in the above embodiments, the present invention is not limited thereto. For example, at least part of a gap between a first wall member, which is disposed so as to face the moving member and to be integral with the axial element housing member, and the moving member, may be filled with a first viscous material FV, such as a grease oil. For example, the first wall member indicated by a broken line may be denoted by reference numeral 309A in FIG. 2A. The "filling" as used herein refers to filling performed by disposing the first viscous material FV without leaving any space at least in one place in the Z direction between the first wall member 309A and the moving member 312 (axisymmetric filling is not necessarily required). Consequently, at least the first viscous material FV can damp the displacement of the moving member 312 with respect to the first wall member 309A, reduce vibration in the Z direction caused by the movement of the measuring probe 300, for example, and prevent an increase in noise associated with an increase in the sensitivity of the measuring probe 300.

Such a configuration may be employed not only in the Z direction but also in the XY direction. For example, at least part of a gap between a second wall member, which is disposed to be integral with the rotary element housing member, and the second diaphragm structure may be filled with a second viscous material SV, such as a grease oil. For example, the second wall member indicated by a broken line may be denoted by reference numeral 309B in FIG. 2A. The "filling" as used herein refers to filling performed by disposing the second viscous material SV without leaving any space at least in one place in the XY direction between the second wall member 309B and the second diaphragm structure 340 (or it may be the rotating member RP by appropriately disposing the second wall member) (axisymmetric filling is not necessarily required). Consequently, at least the second viscous material SV can damp the displacement of the rotating member RP with respect to the second wall member 309B, reduce vibration in the XY direction caused by the movement of the measuring probe 300, for example, and prevent an increase in noise associated with an increase in the sensitivity of the measuring probe 300. Thus, the first viscous material FV and the second viscous material SV can prevent an increase in noise even when the measuring probe 300 is moved at a high speed. Furthermore, since the damping structures in the Z direction and the XY direction are separately provided in such a case, the first viscous material FV and the second viscous material SV can be individually changed. Thus, damping characteristics in the Z direction and the XY direction can be individually optimized.

Although the measuring probe is used as a scanning probe in the above embodiments, the present invention is not limited thereto. For example, the measuring probe may be used as a touch probe.

The present invention can be widely applied to measuring probes used for measuring a three-dimensional shape of an object to be measured.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

What is claimed is:

1. A measuring probe including a stylus having a contact part to be in contact with an object to be measured, an axial motion mechanism having a moving member that allows the contact part to move in an axial direction, and a rotary motion mechanism having a rotating member that allows the contact part to move along a plane perpendicular to the axial direction by a rotary motion with respect to a rotation center, the measuring probe comprising a probe main body that incorporates the rotary motion mechanism, and a probe module that is supported by the probe main body, incorporates the axial motion mechanism, and supports the stylus, wherein the probe main body and the probe module are detachably coupled to each other with a first engagement part capable of positioning to each other.

2. The measuring probe according to claim 1, wherein a plurality of the probe modules are prepared for the single probe main body, and a different restoring force per unit displacement when the moving member is displaced is set for each of the plurality of probe modules.

3. The measuring probe according to claim 1, comprising an axial element housing member that supports the axial motion mechanism, and wherein the axial element housing member is provided with a displacement detector for detecting displacement of the moving member.

4. The measuring probe according to claim 3, wherein the displacement detector outputs a relative position detection signal that allows detection of a relative position of the moving member.

5. The measuring probe according to claim 3, wherein the displacement detector outputs an absolute position detection signal that allows detection of an absolute position of the moving member.

6. The measuring probe according to claim 3, wherein the axial element housing member is provided with an interference optical system including an interference light source, a reference mirror for reflecting light from the interference light source, and a target mirror disposed in the moving member for reflecting light from the interference light source, the interference optical system capable of causing interference of reflected light from the reference mirror and the target mirror to generate a plurality of interference fringes, and the displacement detector can detect a phase shift of the plurality of interference fringes generated in the interference optical system.

7. The measuring probe according to claim 1, comprising a preceding module that detachably couples and supports the probe main body with a second engagement part capable of positioning the probe main body, and wherein a reference member is provided on an opposite end to the stylus of the rotating member, and an orientation detector for detecting displacement of the reference member corresponding to a rotary movement of the stylus is incorporated in the preceding module.

8. The measuring probe according to claim 7, wherein the reference member is a reflecting mirror for reflecting light, the measuring probe includes a light source for causing light to be incident on the reflecting mirror along an optical axis, and the orientation detector detects displacement of reflected light, reflected from the reflecting mirror, from the optical axis.

9. The measuring probe according to claim 8, wherein the optical axis is provided so as to pass through the rotation center of the rotary motion mechanism.

10. The measuring probe according to claim 1, wherein a reference member is provided on an opposite end to the stylus of the rotating member, and an orientation detector for detecting displacement of the reference member corresponding to a rotary movement of the stylus is incorporated in the probe main body.

11. The measuring probe according to claim 10, wherein the axial motion mechanism includes a plurality of first diaphragm structures that allow the moving member to be displaced, and the orientation detector is disposed between the rotary motion mechanism and the plurality of first diaphragm structures when the axial motion mechanism is incorporated in the probe main body and the rotary motion mechanism is incorporated in the probe module.

12. The measuring probe according to claim 1, wherein the axial motion mechanism includes a plurality of first diaphragm structures that allow the moving member to be displaced, and the measuring probe comprises a first limiting member for limiting an amount of deformation in the plurality of first diaphragm structures within a range of elastic deformation.

13. The measuring probe according to claim 1, wherein the rotary motion mechanism includes a second diaphragm structure that allows the rotating member to be displaced, and the measuring probe comprises a second limiting member for limiting an amount of deformation in the second diaphragm structure within a range of elastic deformation.

14. The measuring probe according to claim 1, wherein at least part of a gap between a first wall member, which is disposed so as to face the moving member and to be integral with the axial element housing member for supporting the axial motion mechanism, and the moving member, is filled with a first viscous material.

15. The measuring probe according to claim 1, wherein the rotary motion mechanism includes a second diaphragm structure that allows the rotating member to be displaced, and at least part of a gap between a second wall member, which is to be disposed integral with the rotary element housing member for supporting the rotary motion mechanism, and any of the second diaphragm structure and the rotating member, is filled with a second viscous material.

16. A measuring probe including a stylus having a contact part to be in contact with an object to be measured, an axial motion mechanism having a moving member that allows the contact part to move in an axial direction, and a rotary motion mechanism having a rotating member that allows the contact part to move along a plane perpendicular to the axial direction by a rotary motion, the measuring probe comprising a probe main body that incorporates the axial motion mechanism, and a probe module that is supported by the probe main body, incorporates the rotary motion mechanism, and supports the stylus, wherein the probe main body and the probe module are detachably coupled to each other with a first engagement part capable of positioning to each other.

17. The measuring probe according to claim 16, wherein a plurality of the probe modules are prepared for the single probe main body, and a different restoring force per unit displacement when the rotating member is displaced is set for each of the plurality of probe modules.

18. The measuring probe according to claim 16, wherein the rotating member includes a balancing member on a side opposite to the stylus with respect to a rotation center of the rotary motion mechanism, and a distance between the rotation center and the balancing member is adjustable.

19. The measuring probe according to claim 18, wherein
a plurality of the probe modules are prepared for the single probe main body, and
a different distance between the rotation center and the balancing member is set for each of the plurality of probe modules.

20. The measuring probe according to claim 16, wherein
a plurality of the probe modules are prepared for the single probe main body,
the rotating member includes a balancing member on a side opposite to the stylus with respect to a rotation center of the rotary motion mechanism, and
different mass of the balancing member is set for each of the plurality of probe modules.

21. The measuring probe according to claim 16, wherein the probe module includes
a balance weight corresponding to mass of the stylus, and
a counterbalance mechanism supported by an axial element housing member for supporting the axial motion mechanism, the counterbalance mechanism keeping the stylus and the balance weight in balance.

22. The measuring probe according to claim 21, wherein
a plurality of the probe modules are prepared for the single probe main body, and
different mass of the balance weight is set for each of the plurality of probe modules.

* * * * *